(12) United States Patent
Vollbracht et al.

(10) Patent No.: US 12,066,529 B2
(45) Date of Patent: Aug. 20, 2024

(54) RADAR DEVICE

(71) Applicant: Aptiv Technologies AG, Schaffhausen (CH)

(72) Inventors: Dennis Vollbracht, Hilden (DE); Alexander Ioffe, Bonn (DE)

(73) Assignee: APTIV TECHNOLOGIES AG, Schaffhausen (CH)

( * ) Notice: Subject to any disclaimer, the term of this patent is extended or adjusted under 35 U.S.C. 154(b) by 333 days.

(21) Appl. No.: 17/643,149

(22) Filed: Dec. 7, 2021

(65) Prior Publication Data

US 2022/0187450 A1    Jun. 16, 2022

(30) Foreign Application Priority Data

Dec. 10, 2020   (EP) .................................... 20213050

(51) Int. Cl.
  *G01S 13/931* (2020.01)
  *G01S 7/03*  (2006.01)
  (Continued)

(52) U.S. Cl.
  CPC ............ *G01S 13/931* (2013.01); *G01S 13/32* (2013.01); *G01S 13/872* (2013.01); *H01Q 21/28* (2013.01); *G01S 2013/468* (2013.01)

(58) Field of Classification Search
  CPC ...... G01S 13/931; G01S 13/32; G01S 13/872; G01S 2013/468; G01S 7/4021;
  (Continued)

(56) References Cited

U.S. PATENT DOCUMENTS 9,869,762 B1   1/2018  Alland et al.
10,620,305 B2  4/2020  Thales
(Continued)

FOREIGN PATENT DOCUMENTS

DE   102004046634   3/2006
DE   102017221049   5/2018
(Continued)

OTHER PUBLICATIONS

"Extended European Search Report", EP Application No. 20213050.6, May 25, 2021, 11 pages.
(Continued)

*Primary Examiner* — Tyler D Paige
(74) *Attorney, Agent, or Firm* — Harness, Dickey & Pierce, P.L.C.

(57) ABSTRACT

A radar device comprises a radar circuit configured to transceive first radar signals that occupy a first frequency band and second radar signals that occupy a second frequency band. An antenna device of the radar device comprises a first set and a second set of antennas and is configured to selectively transduce the first radar signals via the first set and not via the second set and to selectively transduce the second radar signals via the second set and not via the first set. A processing device of the radar device detects from the first radar signals target reflections via first propagation channels and from the second radar signals target reflections via second propagation channels. The signal processing device jointly evaluates the target reflections via the first and second propagation channels to form a common virtual antenna array for determining an angular position of a target object.

20 Claims, 11 Drawing Sheets

(51) Int. Cl.
*G01S 13/32* (2006.01)
*G01S 13/46* (2006.01)
*G01S 13/87* (2006.01)
*H01Q 21/28* (2006.01)

(58) Field of Classification Search
CPC .... G01S 7/4026; G01S 13/4454; G01S 7/032; G01S 7/03; G01S 13/343; G01S 7/0234; G01S 7/0235; G01S 7/024; G01S 13/325; G01S 13/584; G01S 2013/93271; G01S 7/0232; G01S 13/02; H01Q 21/28; H01Q 1/3233; H01Q 5/40; H01Q 21/061; H01Q 5/50
USPC ......................................................... 701/301
See application file for complete search history.

(56) References Cited

U.S. PATENT DOCUMENTS

| | | | |
|---|---|---|---|
| 2011/0163909 A1 | 7/2011 | Jeong | |
| 2011/0267217 A1 | 11/2011 | Hildebrandt et al. | |
| 2014/0218259 A1 | 8/2014 | Lee et al. | |
| 2017/0170563 A1* | 6/2017 | Maas | H01Q 21/061 |
| 2017/0363713 A1 | 12/2017 | Kim | |
| 2019/0324133 A1* | 10/2019 | Hong | G01S 7/42 |
| 2021/0239791 A1* | 8/2021 | Vollbracht | G01S 13/931 |
| 2021/0239821 A1 | 8/2021 | Vollbracht et al. | |
| 2021/0239822 A1 | 8/2021 | Vollbracht et al. | |

FOREIGN PATENT DOCUMENTS

| | | |
|---|---|---|
| DE | 102017223429 | 7/2018 |
| EP | 3605135 | 2/2020 |
| WO | 2020007573 | 1/2020 |

OTHER PUBLICATIONS

"Extended European Search Report", EP Application No. 20155503.4, Jul. 24, 2020, 9 pages.
"Extended European Search Report", EP Application No. 20155495.3, Aug. 7, 2020, 11 pages.
"Extended European Search Report", EP Application No. 20155499.5, Aug. 7, 2020, 11 pages.
"FR5CPEC Radar sensor for vehicular use Teardown Internal Photos Robert Bosch GmbH", Retrieved at: https://fccid.io/NF3FR5CPEC/Internal-Photos/internal-Photos-4041421, Oct. 10, 2018, 6 pages.
Trummer, "A Polarimetric 76-79 GHz Radar-Frontend for Target Classification in Automotive Use", Oct. 2016, 4 pages.

* cited by examiner

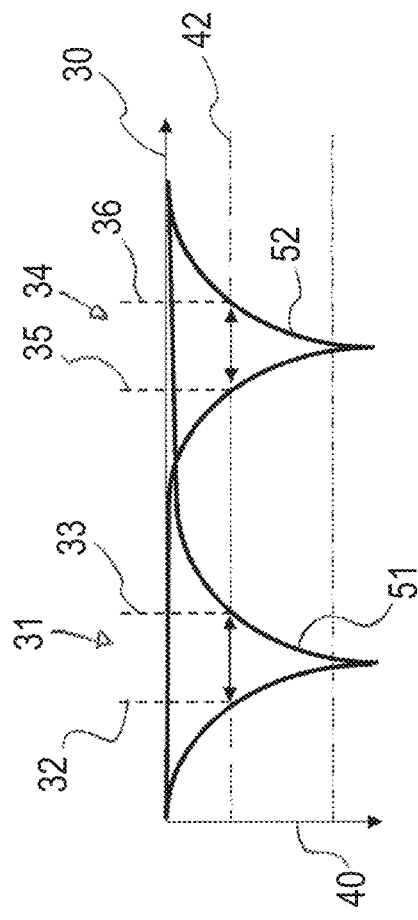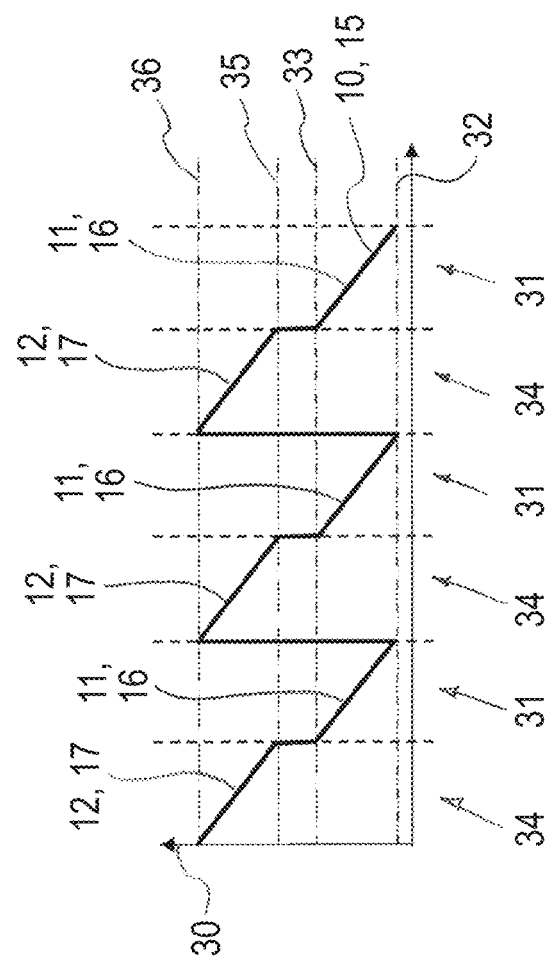
Fig. 3
Fig. 4

RADAR DEVICE

CROSS-REFERENCE TO RELATED APPLICATION

This application claims priority to European Patent Application Number 20213050.6, filed Dec. 10, 2020, the disclosure of which is hereby incorporated by reference in its entirety herein.

BACKGROUND

Radar devices are used in automotive applications to detect and locate target objects such as other vehicles, obstacles, or lane boundaries. They may be placed at the front, at the rear or at the sides of a vehicle. Such radar devices usually comprise a signal generator to generate a radar signal, an antenna device for illuminating the target objects with the radar signal and for capturing the radar signal reflected back from the target objects and a signal receiver to analyze the radar signal reflected back from the target objects. The information extracted from the reflected radar signal may then be used for advanced driver-assistance system (ADAS) functions, such as emergency brake assist, adaptive cruise control, lane change assist or the like.

Antenna devices for automotive applications usually comprise several transmit antennas and several receive antennas. Usually, the radar circuit is able to vary the individual signals that are fed to individual transmit antennas independently from each other, for example in frequency, amplitude, or phase. Likewise, it is able to analyze the individual signals captured by the individual receive antennas independently from each other. Typically, each pair of transmit antenna and receive antenna defines a propagation channel for the radar signal from the respective transmit antenna to the target object and back to the respective receive antenna. When feeding the individual transmit antennas with orthogonal signals that are separable at the receiver and ensuring that each antenna is able to receive all signals transmitted, the number of propagation channels that are accessible for signal evaluation amounts to the product of the number of transmit antennas and the number of receive antennas.

For determining an angular position of a target object irradiated by the radar device, the transmit antennas and receive antennas are usually placed at different locations on the antenna device and the angular position of the target object is deduced from phase shifts acquired by the radar signals propagating along the individual propagation channels. For resolving the angular position of the target objects along a specific direction, the individual antennas of the radar device have to be displaced with respect to each other along said direction. Usually, the accuracy with which the angular position of the target object may be determined increases with the number of propagation channels and thus individual antennas available.

Accordingly, there is a need to increase the number of propagation channels available for determining the angular positions of target objects irradiated by the radar device.

SUMMARY

The present disclosure relates to radar device for automotive applications, a vehicle with such a radar device and a method for operating a radar device for automotive applications. Embodiments are given in the claims, the description, and the drawings.

In one aspect, the present disclosure is directed at a radar device for automotive applications comprising a radar circuit for transceiving radar signals, an antenna device for transducing the radar signals and a signal processing device for processing the radar signals. The radar circuit is configured to transceive first radar signals that occupy a first frequency band and second radar signals that occupy a separate second frequency band. The antenna device comprises a first set of first antennas and a second set of second antennas and is configured to selectively transduce the first radar signals via the first antennas and not via the second antennas and to selectively transduce the second radar signals via the second antennas and not via the first antennas. The signal processing device is configured to detect from the first radar signals target reflections via first propagation channels and to detect from the second radar signals target reflections via second propagation channels, wherein the signal processing device is configured to jointly evaluate the target reflections via the first and second propagation channels to form a common virtual antenna array for determining an angular position of a target object irradiated by the antenna device.

The present disclosure is based on the idea that the number of propagation channels that are available for determining the angular position of a target object may be increased by expanding an antenna array operating within a first frequency band with antennas operating within a separate second frequency band. In other words, the propagation channels established between the antennas operating within the second frequency band are added to the propagation channels established between the antennas operating within the first frequency band. Adding the first and second propagation channels to form a common virtual array of antennas leads to an increase in the achievable angular resolution, which is inversely proportional to the number of propagation channels used and given by $d\vartheta = \lambda / N \cdot d \cdot \cos \vartheta$, with $\lambda$ being the wavelength of the radar signals, $N$ the number of propagation channels, $d$ the effective spacing of the virtual antennas of the virtual antenna array and $\vartheta$ the angular position of the target object. The additional propagation channels may, for example, be used to increase the angular resolution in azimuthal and/or elevation direction.

The first set of first antennas and/or the second set of second antennas each may be operated, for example, in a multiple input multiple output (MIMO) configuration, wherein the first set of antennas and/or the second set of antennas each comprise a plurality of transmit antennas and a plurality of receive antennas. The individual first and/or second propagation channels are then defined between each individual combination of transmit and receive antenna of the respective set of antennas.

Since the first antennas and the second antennas transduce in separate frequency bands, the first propagation channels are only established between the first antennas and the second propagation channels are only established between the second antennas and there are no propagation channels that are established between one of the first antennas and one of the second antennas. At least part of the first antennas is placed at separate positions from all second antennas and at least part of the second antennas is placed at separate positions from all first antennas. For example, the antenna device may comprise a single pair of one of the first transmit antennas and one of the second transmit antennas that form first and second reference transmit antennas, respectively, and a single pair of one of the first receive antennas and one of the second receive antennas that form first and second reference receive antennas, respectively. The first and second reference transmit antenna may be placed at the same position on the antenna device and the first and second reference receive antenna may be placed at the same position on the antenna device. All other first and second antennas may be placed at separate positions with respect to each other.

To separate the individual radar signals transduced via the transmit antennas after reception at the receive antennas, the individual first radar signals transduced by the transmit antennas of the first set of antennas may be generated with mutually independent first separability parameters and/or the individual second radar signals transduced by the transmit antennas of the second set of antennas may be generated with mutually independent second separability parameters. The separability parameters may, for example, employ phase shift keying, for example binary phase shift keying, or phase modulation, for example binary phase modulation, or the like. Alternatively, the individual transmit antennas may also transmit their radar signals using time division multiplexing (TDM).

The radar device may be configured to transceive one of the first radar signals having a separability parameter for ensuring separability among the individual first radar signals and to transceive one of the second radar signals having the same separability parameter for ensuring separability among the individual second radar signals during the evaluation of the target reflections by the signal processing device. For example, the radar device may be configured to transceive all first radar signals with a set of mutually independent separability parameters, such as mutually independent phase codes, and to transceive all second radar signals having the same set of mutually independent separability parameters.

The radar device, for example the signal processing device and/or the radar circuit, may further be configured to separate the first radar signals from the second radar signals by separating signals within the first frequency band from signals within the second frequency band, for example by using a frequency filter or diplexer. This allows for simultaneous transmission of the first and second radar signals even in cases where only a limited number of separability parameters are available, for example due to hardware restrictions, such as binary phase shifters for implementing orthogonal phase codes on the radar signals.

Each pair of transmit and receive antenna within the first set of antennas realizes a separate first propagation channel and each pair of transmit and receive antenna within the second set of antennas realizes a separate second propagation channel. The signal processing device may resolve the individual propagation channels within the different sets of antennas using the separability parameters of the individual radar signals transduced via the antennas of the corresponding set. The signal processing device may determine the propagation and/or reflection properties of the individual propagation channels by comparing the radar signals that are transmitted with the radar signals that are received via the antennas associated with the individual propagation channel and by analyzing a propagation delay introduced by the respective propagation channel.

The radar device may be configured as a continuous wave (CW) radar device and the radar signals may exhibit signal modulations that are used for determining the propagation delay of the individual target reflections travelling along the individual propagation channels. Such signal modulations may comprise frequency modulations, like a series of frequency chirps, phase modulations, or the like. The radar device may therefore be configured as a frequency modulated continuous wave (FMCW) or as a phase modulated continuous wave (PMCW) radar device.

When being configured as a FMCW radar device, the individual first radar signals may comprise a series of first frequency chirps spanning the first frequency band and the individual second radar signals may comprise a series of second frequency chirps spanning the second frequency band. The first and second frequency chirps may each have constant slope, for example constant falling slope. Additionally, the first and second frequency chirps may all exhibit the same slope.

The first and second radar signals may be configured as simultaneous transmit and receive pulse Doppler (STAR PD) signals. With these STAR PD signals, the first and second radar signals may each comprise a multitude of pulsed frequency sweeps over the first and second frequency band, respectively.

The radar device may be configured to simultaneously transmit and receive individual pairs of first and second radar signals or all first and second radar signals. For example, the radar device may be configured to simultaneously transmit and receive a chirp cycle (burst) of every first and second radar signal and to simultaneously capture the target reflections of the chirp cycles via all first and second propagation channels.

The signal processing device may be configured to compare, for each propagation channel, the radar signal received via the respective receive antenna with the radar signal transmitted via the respective transmit antenna of the propagation channel to generate a comparison signal that represents the propagation delay of a target reflection via the respective propagation channel. The signal processing device may generate the comparison signal, for example, by mixing the received radar signal with the instantaneously transmitted radar signal to generate the comparison signal as an intermediate signal at the difference frequency of the received and transmitted radar signal. From the individual comparison signals, range values indicating the distance to target objects may be deduced for each first and second propagation channel. To this end, the comparison signals of the individual frequency chirps transmitted via the respective propagation channel may each be mapped to a set of range bins by performing a first Fourier transform on the comparison signals of the individual frequency chirps of the respective propagation channel.

Furthermore, for each range value of each propagation channel, target velocity values may be deduced. To this end, the signal processing device may be configured to map the comparison signals into Doppler bins via a second Fourier transform, whereby the second Fourier transform is performed, for a given range bin, over the corresponding range bins of all frequency chirps transmitted via the respective propagation channel.

While the signal processing for determining the range and velocity values of the target objects is performed individually for each propagation channel, the signal processing device further jointly evaluates target reflections via all first and second propagation channels to determine the angular positions of the target objects from the differences in the propagation delays that the individual target reflections exhibit while travelling via their respective propagation channel. To generate the individual differing propagation delays, the transmit and receive antennas of the individual first and second propagation channels have varying relative antenna spacings in the directions along which the angular positions of the target objects are determined. For example, the relative antenna spacing between the transmit and receive antenna of the individual propagation channels may linearly increase over all first and second propagation channels. The virtual antennas of the common virtual antenna array constructed from the first and second propagation channels then have equal effective spacings from each other.

The signal processing device may jointly evaluate target reflections via the first and second propagation channels by concatenating the comparison signals of the first propagation channels and the comparison signals of the second propagation channels prior to signal processing. For example, the signal processing device may perform, for each combined range-velocity bin, a third Fourier transform over the concatenated comparison signals of the first and second propagation channels. All Fourier transforms, such as the first and/or second and/or third Fourier transform, may be performed as fast Fourier transforms (FFT).

The individual signal modulations, such as the first and second frequency chirps, may be cyclically repeated. The radar circuit may be configured to first generate the first radar signals and to then generate the second radar signals and the antenna device may be configured to first transduce the first radar signals and to then transduce the second radar signals. When cyclically repeating the first and second signal modulations, the first radar signals and the second radar signals may be alternately generated by the radar circuit and subsequently transduced by the antenna device.

The radar circuit of the radar device comprises all parts of the radar device that process the radar signals at the radar frequency used for irradiating the target objects. The radar circuit thus constitutes a radar front end of the radar device. The radar circuit may comprise a signal generator for generating the radar signals and a signal receiver for receiving and measuring the radar signals. The radar circuit may be configured as a transceiver comprising a transmitter, for example the signal generator, and the receiver.

The radar circuit is configured to transceive or handle the radar signals. It may transceive the radar signals by generating them at the signal generator based on at least one control signal and/or it may transceive the radar signals by evaluating or measuring them at the signal receiver to generate at least one data signal. Likewise, the radar signals may be routed between the radar circuit and the antenna device by sending them from the radar circuit to the antenna device and/or by sending them from the antenna device to the radar circuit.

For generating the radar signals from the at least one control signal, the signal generator comprises one or more transmit chains. Each transmit chain is configured to convert one control signal into one transmit port signal and to output this transmit port signal to one signal port of the radar circuit that is connected to an antenna port of the antenna device. The transmit port signals generated by the transmit chains then provide the first and second radar signals.

Each transmit chain may comprise, for example, a digital to analog converter (DAC) that is controlled by the control signal controlling the transmit chain and/or one or several signal control devices that are likewise controlled by the control signal and shape the transmit port signal generated by the transmit chain. Such signal control devices may be configured as, for example, variable attenuators or amplifiers, variable phase shifters, and/or the like. The signal generator may receive the control signals from the signal processing device of the radar device. The control signals may, for example, be digital control signals.

For generating the at least one data signal from the radar signals, the signal receiver comprises one or more receive chains. Each receive chain is configured to receive one receive port signal via a signal port of the radar circuit that is connected to an antenna port of the antenna device. The individual receive port signals provide the radar signals to the receive chains. Each receive chain is further configured to convert the receive port signal into one data signal and to output the data signal to the signal processing device. Each receive chain may comprise, for example, an analog to digital converter (ADC) that samples the port signal and generates the data signal outputted by the receive chain and/or one or more signal conditioning devices such as low noise amplifiers, programmable filters, mixers, and/or the like that shape the port signal prior to sampling. The data signals representing the receive port signals may be digital data signals.

The radar circuit may be configured to handle several independent port signals, for example to generate several independent transmit port signals from several independent control signals and/or to measure several independent receive port signals to generate several independent data signals. The signal generator may then comprise several transmit chains, one transmit chain for each transmit port signal and/or the signal receiver may then comprise several receive chains, one receive chain for each receive port signal. Each transmit chain is configured to generate an individual transmit port signal from an individual control signal, the individual control signals and transmit port signals being mutually independent from each other. Likewise, each receive chain is configured to measure an individual receive port signal received from the antenna device and to generate an individual data signal from the respective receive port signal, the individual receive port signals and individual data signals being mutually independent from each other.

The individual transmit chains are coupled to the antenna device via individual transmit ports of the radar circuit and the individual receive chains are coupled to the antenna device via individual receive ports of the radar circuit. Each transmit port is coupled to one of the transmit chains of the radar circuit and is schematically located between the transmit chain and the antenna device and each receive port is coupled to one of the receive chains of the radar circuit and is schematically located between the receive chain and the antenna device. Each individual transmit port of the radar circuit may therefore be schematically located between the last signal control device of its associated transmit chain and the antenna device. Likewise, each receive port of the radar circuit may be schematically located between the antenna device and the first signal conditioning device of its associated receive chain. The transmit ports and the receive ports constitute signal ports of the radar circuit.

According to the present disclosure, a radar signal is defined as the signal that is transduced by an individual antenna of the antenna device. Likewise, a port signal is defined as the signal that is routed via an individual signal port of the radar circuit and that is processed by a single transmit chain or a single receive chain of the radar circuit. One port signal may comprise a single radar signal, for example if only one antenna is connected to the signal port routing the port signal, or it may comprise several radar signals, such as one of the first and one of the second radar signals, for example if more than one antenna, such as one of the first antennas and one of the second antennas, is connected to a common signal port routing the port signal. In the latter case, each radar signal constitutes a separate signal portion of the port signal.

The individual port signals and/or individual radar signals may exhibit individual and mutually independent signal parameters, such as phases, amplitudes, chirps, phase shifts, code sequences, for example binary phase shift codes, and/or the like. The mutually independent signal parameters may constitute an orthogonal and linearly independent set of parameters. The individual and mutually independent signal parameters may amount to separability parameters that ensure separability among the individual port signals after reception, for example for constructing the virtual antenna array.

The radar circuit may be configured in an integrated circuit. The radar circuit may be configured in this single integrated circuit only or it may be distributed over one or more additional integrated circuits. The integrated circuits may be phase coherently coupled to each other. The integrated circuits may be configured, for example, as monolithic microwave integrated circuits (MMICs). The individual ports of the radar circuit may be physical connection points of one or several integrated circuits of the radar circuit, for example of a MIMIC comprising the radar circuit. They also may be logical or conceptual ports that are located at signal lines between the transmit chains and the antenna device and/or at signal lines between the receive chains and the antenna device, respectively, for example in radar devices, in which individual components of the radar circuit and the antenna device are integrated on a common carrier, like a common substrate.

The antenna device may transduce the radar signals by converting them into electromagnetic radiation that is emitted towards the target object irradiated by the antenna device and/or it may transduce the radar signals by receiving electromagnetic radiation scattered back by the target object and by converting the received electromagnetic radiation into the radar signals. The individual antenna elements of an antenna may be conductively coupled to their respective signal port of the radar circuit. They also may be proximity coupled, for example via conductive or inductive coupling. The individual antennas may be configured as substrate integrated antennas such as microstrip patch antennas or slotted substrate integrated waveguide (SIW) antennas. They also may be configured as end-fire antennas, 3D antennas or metallized plastic antennas.

The first frequency band occupied by the first radar signals and the second frequency band occupied by the second radar signals may have a frequency gap in between them. The frequency gap may amount to at least a tenth, at least a fifth, at least a third or at least one half of the frequency span of the first and/or second frequency band. The frequency gap may amount to at most a tenth, at most a fifth, at most a third or at most one half of the frequency span of the first and/or second frequency band. Alternatively, the first frequency band may directly adjoin the second frequency band so that the first and second radar signals exhibit no frequency gap in between them. The first radar signals may exhibit a first frequency modulation and the second radar signals may exhibit a second frequency modulation.

Additionally, to jointly evaluate the first and second radar signals, the signal processing device may be configured to separately evaluate only the first radar signals and/or to separately evaluate only the second radar signal to obtain target information that is only accessible to one of the first and second set of antennas and not to the other one. The accessibility of such target information may, for example, result from different antenna parameters and/or different antenna fields of the first and second antennas transducing the first and second radar signals, respectively, such as different antenna gains and/or different signal-to-noise ratios of the received radar signals and/or different antenna fields of view and/or different polarizations or the like. The first propagation channels constructed from the first set of antennas and the second propagation channels constructed from the second set of antennas may have different propagation channel properties like polarization and/or field of view, for example in elevation direction and/or in azimuthal direction, and/or radiation direction, and/or detection range, and/or signal gain, and/or the like.

The antenna device may be configured to transduce the first radar signals with a first polarization and to transduce the second radar signals with a second polarization, wherein the second polarization is different from, for example orthogonal to, the first polarization. Consequently, first radiation fields transduced by the first antennas have the first polarization and second radiation fields transduced by the second antennas have the second polarization.

For example, the first polarization and the second polarization may be linear polarizations, and the first or second radar signals may be transduced with horizontal linear polarization and the other one of the first and second radar signals may be transduced with vertical linear polarization. The first polarization and the second polarization may also be circular polarizations, and the first or second radar signals may be transduced with left-handed circular polarization and the other one of the first and second radar signals may be transduced with right-handed circular polarization.

Transducing the first radar signals and the second radar signals with different polarizations improves the isolation between the first propagation channels constructed from the first radar signals and the second propagation channels constructed from the second radar signals. If the antenna device comprises a first set of antennas including the first antenna transducing the first radar signal and a second set of antennas including the second antenna transducing the second radar signal, all antennas of the first set may transduce with the first polarization and all antennas of the second set may transduce with the second polarization. Therefore, all first propagation channels constructed from the first set of antennas may operate at the first polarization and all second propagation channels constructed from the second set may operate at the second polarization.

When evaluating the data signals generated from the received radar signals in the signal processing device, the different polarizations of the first and second radar signal may be used, for example, for classification of the detected target objects. In this way, polarimetric properties of the target objects may be detected and used during object classification by the signal processing device. This object classification may be performed, for example, by machine-learned algorithms that have been trained on data signals representing the polarimetric properties of different training target objects.

The first antennas transducing the first radar signals each may have a first field of view and the second antennas transducing the second radar signals each may have a second field of view that is different from the first field of view. The signal processing device may then be configured to jointly evaluate the first propagation channels established by the first antennas and the second propagation channels established by the second antennas only if the target object is located in a common field of view that is given by an intersection of the first field of view and the second field of view.

For example, the first field of view may have a first lateral extent along a lateral direction, and the second field of view may have a second lateral extent along the lateral direction, wherein the first lateral extent is larger than the second lateral extent. Additionally or alternatively, the first field of view may have a first longitudinal extend along a longitudinal direction, and the second field of view may have a second longitudinal extent along the longitudinal direction, wherein the first longitudinal extent is smaller than the second longitudinal extent.

This allows the radar device to perform different radar functions that necessitate different fields of view by only evaluating the first propagation channels or the second propagation channels, respectively. For example, the data signals from the second antennas may be used by the signal processing device for long-range radar (LRR) functions and/or adaptive cruise control and/or emergency brake assist, and the data signals from the first antennas may be used for mid-range radar (MRR) or short-range radar (SRR) functions and/or lane change assist, and/or cross traffic detection, and/or parking assist.

To realize a small field of view, the second antennas each may comprise a multitude of antenna elements that are placed next to each other along the lateral direction and form a phased array that narrows the beam solid angle of the second antennas in the lateral direction. The first antennas each may comprise a multitude of antenna elements that form a larger beam solid angle than the antenna elements of the second antennas, for example, due to the first antennas having a smaller number of antenna elements than the second antennas.

According to the present disclosure, an antenna of the antenna device is generally formed by all antenna elements that collectively transduce between a radiation field of the antenna in the far-field region and its associated radar signal handled by the radar circuit. Such an antenna may comprise a single antenna element or it may be configured as an array antenna that comprises a set of antenna elements that form individual radiating elements of the antenna and coherently transduce between the radiation field and the radar signal. If the antenna is a receive antenna, the radiation field is an incoming radiation field that is captured by the antenna elements. If the antenna is a transmit antenna, the radiation field is an outgoing radiation field generated by the antenna elements.

The radiation field of an antenna has well-defined instantaneous field parameters in the far-field of the antenna like phase center, frequency, amplitude, and the like. Likewise, each antenna has antenna parameters that define the characteristics of the antenna and its radiation field. These antenna parameters may be a radiation pattern, polarization, gain, directivity, location of phase center or antenna position, and the like.

The individual radar signals are oscillating electromagnetic signals, such as microwave signals. The radar frequencies of the radar signals may be at least 1 GHz, at least 30 GHz, at least 60 GHz or at least 70 GHz. They may be at most 200 GHz, at most 100 GHz, at most 85 GHz, at most 60 GHz or at most 40 GHz. The radar frequencies of the radar signals may lie, for example between 31 GHz and 37 GHz or between 75 GHz and 85 GHz, or between 76 GHz and 81 GHz. The first frequency band of the first radar signals may lie between 75 GHz and 78 GHz, for example between 75.5 GHz and 77.5 GHz, and the second frequency band of the second radar signals may lie between 79 GHz and 82 GHz, for example between 79.5 GHz and 81.5 GHz.

The radar device may be mounted to a vehicle. The radar device may be configured as an interior radar device that captures target reflection from a passenger compartment of the vehicle or as an exterior radar device that captures target reflections from the outer environment of the vehicle, for example as a front radar or a side radar or a rear radar. The radar device may be used in automotive applications to detect and locate target objects such as other vehicles, obstacles, or lane boundaries. Such target objects may be placed at the front, at the rear or at the sides of a vehicle.

The radar device may be part of a vehicle control system and may be connected to a control device of the vehicle control system. The control device may be configured to perform advanced driver-assistance functions, such as adaptive cruise control, emergency brake assist, lane change assist or autonomous driving, based on the data signals received from the radar device. The control device and/or the signal processing device of the radar device may be configured as programmable logic devices, such as programmable logic controllers, FPGAs, ASICs, or microprocessors.

According to an embodiment, a phase center of a first reference transmit antenna from the first set of antennas and a phase center of a second reference transmit antenna from the second set of antennas coincide and a phase center of a first reference receive antenna from the first set of antennas and a phase center of a second reference receive antenna from the second set of antennas coincide.

Thus, a first reference propagation channel established between the first reference transmit antenna and the first reference receive antenna and a second reference propagation channel established between the second reference transmit antenna and the second reference receive antenna have the same path length for all target objects. Therefore, a relative phase difference between target reflections propagating via the first reference propagation channel operated in the first frequency band and target reflections propagating via the second reference propagation channel operated in the second frequency band is independent of the distance travelled by the first and second radar signals. The differential phase shift acquired via the first and second reference propagation channel may thus be used to calibrate any phase differences between the first and second propagation channels caused by the frequency difference between the first and second radar signals.

The first reference transmit antenna and the second reference transmit antenna may be formed by a single broadband antenna that is configured to transduce both in the first and second frequency band. Analogously, the first reference receive antenna and the second reference receive antenna may be formed by a single broadband antenna that is configured to transduce both in the first and second frequency band.

According to an embodiment, the signal processing device is configured to measure a phase difference of a first reference signal propagating via a first reference propagation channel established between the first reference transmit and receive antenna and a second reference signal propagating via a second reference propagation channel established between the second reference transmit and receive antenna. The signal processing device is further configured to compensate the measured phase difference when jointly evaluating the target reflections via the first and second propagation channels.

This compensation removes any phase shifts between the first and second propagation channels that result from the first and second radar signals occupying different frequency bands and having different signal properties. Therefore, any phase differences that are independent of the differential path lengths between the individual propagation channels may be removed and the angular position of the target object may be determined with high accuracy. The phase difference may be deduced from a first intermediate signal that is generated from the first radar signal transduced via the first reference transmit and receive antenna and a second intermediate signal that is generated from the second radar signal transduced via the second reference transmit and receive antenna. The radar device may be configured to simultaneously transmit and/or receive the first and second reference signal.

In addition to the phase difference caused by the different frequencies of the first and second radar signal, the signal processing device may be configured to compensate further contributions to a total differential phase shift between the first and second reference propagation channel.

According to an embodiment, the signal processing device is configured to compensate for an angle-dependent phase shift caused by different radiation patterns of the first reference antennas within the first frequency band and the second reference antennas within second frequency band, and/or a range-dependent phase shift caused by a change of a distance to the target object in between the target reflections of the first reference signal and the target reflections of the second reference signal, and/or a global phase offset of the first reference signal from the second reference signal upon generation of the first and second reference signals.

For example, the total differential phase shift between the first and second reference signal may depend on the angular position of the target object in azimuthal and/or elevation direction due to different antenna radiation patterns of the first reference antenna operating in the first frequency band and the second reference antenna operating in the second frequency band. The signal processing device may therefore determine a first angle-dependent phase shift $\Delta\varphi\_AZ$ due to the angular position of the target object in a first direction, such as the azimuthal direction, and/or a second angle-dependent phase shift $\Delta\varphi\_EL$ due to the angular position of the target object in a second direction, such as the elevation direction.

For determining the angle-dependent phase shifts, the signal processing device may comprise a differential phase pattern derived from the radiation pattern of the first reference antenna and the radiation pattern of the second reference antenna. The differential phase pattern may comprise the values of the angle-dependent phase shifts $\Delta\varphi\_AZ$ and/or $\Delta\varphi\_EL$ in dependence of the angular position of the target object. It may, for example, be stored in a memory module of the signal processing device.

The angle-dependent phase shifts $\Delta\varphi\_AZ$ and/or $\Delta\varphi\_EL$ may have been measured on a test facility by measuring the angle-dependent phases of the radiation patterns of the first and second reference antenna. This measurement may have been performed during a pre-calibration procedure of the antenna device. A method for operating the radar device described herein may therefore comprise the steps of measuring the angle-dependence of the radiation patterns of the first and second reference antenna, for example the angle-dependence of the phase values of the radiation patterns of the first and second reference antenna, in a first direction, such as the azimuthal directions, and in a second direction, such as the elevation direction, and storing the results of these measurements in a memory module of the radar device, for example as the differential phase pattern.

Additionally or alternatively, the total differential phase shift may depend on a relative movement of the target object with respect to the radar device in between reflection of the first reference signal and the second reference signal, for example in cases in which the radar circuit operates in alternating mode. Therefore, the range between the target object and the radar device may change from the reflection of the first reference radar signal to the reflection of the second reference radar signal. The signal processing device may be configured to determine the range-dependent phase shift $\Delta\varphi\_RANGE$, for example by performing a Doppler measurement for determining the relative radial target velocity of the target object and by estimating the range difference from the relative target velocity and the time span between emission of the first and second reference signal.

Additionally or alternatively, the total differential phase shift may depend on a global phase offset $\Delta\varphi\_GL$ introduced when generating the first and second reference signal, for example in cases, in which the radar circuit operates in an alternating mode and alternately transceives the first and second radar signals. The global phase offset may, for example, result from different starting phases of at least one reference oscillator of the radar circuit used to generate the first and second reference signal. The signal processing device may be configured to determine the global phase offset $\Delta\varphi\_GL$ from a time delay between the generation of the first and second reference signals and the frequency difference of the first and second reference signal, and, optionally, from an additional phase offset of the stating phases of these signals, such as a random phase offset or a phase offset between two integrated circuits used to generate the first and second reference signal, respectively.

The signal processing device may determine the phase shifts $\Delta\varphi\_AZ$ and/or $\Delta\varphi\_EL$ and/or $\Delta\varphi\_GL$ and/or $\Delta\varphi\_RANGE$ separate from the phase measurements the first and second reference signals propagating via the first and second reference propagation channel. Alternatively, any of these parameters may also be included in the phase difference that is determined from the first and second reference signals propagating via the first and second reference propagation channel. The phase shifts $\Delta\varphi\_AZ$ and/or $\Delta\varphi\_EL$ and/or $\Delta\varphi\_RANGE$ of a given measurement may be derived as predictions from previous measurements of the target position and/or velocity. The radar device may neglect the range-dependent phase shift $\Delta\varphi\_RANGE$ and/or the global phase offset $\Delta\varphi\_GL$ when simultaneously transmitting at least the first and second reference radar signal. This requires less processing, provides faster results, and does not rely on a prediction from previous measurements for establishing the range-dependent phase shift $\Delta\varphi\_RANGE$ and/or the global phase offset $\Delta\varphi\_GL$.

The total differential phase shift between the first and second propagation channels may be compensated by scaling the phase values of all intermediate signals obtained from either the first or second propagation channels by a scale factor deduced from the total differential phase shift between the first and second reference propagation channel. When scaling the phases of the intermediate signals obtained from the first propagation channels, the scale factor may amount to the ratio of a second reference phase of the intermediate signal obtained from the second reference propagation channel to a first reference phase of the intermediate signal obtained from the first reference propagation channel. The inverse of this scale factor may be used when scaling the phases of the intermediate signals obtained from the second propagation channels. The additional phase shift may be compensated after mapping the intermediate signals to range bins and/or after mapping the intermediate signals to velocity bins.

According to an embodiment, the signal processing device is configured to determine the angular position of the target object from relative phase shifts between all target reflections propagating via the first and second propagation channels. This allows determining the angular position of the target object with high accuracy, since the angular resolution increases with the number of evaluated propagation channels.

According to an embodiment, the signal processing device is configured to jointly evaluate phase values derived from all first and second propagation channels to determine the angular position of the target object, for example by preforming a common Fourier transform on said phase values. This allows determining the angular position of the target object with high accuracy and within short time. Instead of jointly processing the phase values by performing a common Fourier transform, the angular position of the target object may also be determined using other angle finding algorithms, such as super resolution.

According to an embodiment, all individual transmit antennas of the first and second set of antennas are aligned with each other along a first direction and all individual receive antennas of the first and second set of antennas are aligned with each other along the first direction. Therefore, the common virtual antenna array formed by evaluating the first and second propagations channels is also aligned along the first direction. All phase shifts acquired during propagation over the first and second propagation channels therefore depend on the angular position of the target objects in the first direction so that angular resolution along the first direction is maximized.

According to an alternative embodiment, a part of the first and/or second antennas is distributed along a first direction and a further part of the first and/or second antennas is distributed along a second direction, wherein the second direction is different from the first direction, for example orthogonal to the first direction. This allows simultaneous determination of the angular position of target objects along both the first and second direction and therefore separation of individual target objects based on their position along both these directions.

According to an embodiment, the first direction is an azimuthal direction with respect to a ground surface navigated by a vehicle comprising the radar device and the second direction is an elevation direction with respect to the ground surface.

According to an embodiment, one of the first antennas and one of the second antennas are coupled to a common signal port of the radar circuit, the common signal port being configured to route both the first radar signal transduced via the respective first antenna and the second radar signal transduced via the respective second antenna. Routing both the first radar signal and the second radar signal via the common signal port reduces the number of signal ports that are needed for connecting the first and second antennas to the radar circuit.

The common signal port routing the first and second radar signal may be a transmit port of the radar device and the first and second antenna may be transmit antennas of the antenna device. Alternatively, the common signal port may be a receive port of the radar device and the first and second antenna may be receive antennas of the antenna device. For example, the first antenna coupled to the common signal port may be the first reference transmit antenna and the second antenna coupled to the common signal port may be the second reference transmit antenna. Alternatively, the first antenna coupled to the common signal port may be the first reference receive antenna and the second antenna coupled to the common signal port may be the second reference receive antenna.

The port signal routed via the common signal port comprises the first radar signal as a first signal portion occupying the first frequency band and the second radar signal as a second signal portion occupying the second frequency band. Therefore, the full bandwidth of the radar circuit that is routed via the common signal port may be shared among the first and second antenna. If the radar circuit comprises an integrated circuit, the common signal port may be configured as an external connection point of the integrated circuit. Routing the first and second radar signal via the common signal port then effectively doubles the individual antennas and propagation channels that are addressable via the connection point forming the common signal port.

The antenna device may be configured as a frequency selective antenna device that transduces the first radar signal occupying the first frequency band via the first antenna, but not via the second antenna and that transduces the second radar signal occupying the second frequency band via the second antenna, but not via the first antenna.

Frequency selectivity of the antenna device may, for example, be realized by employing a frequency selective first antenna and a frequency selective second antenna that are directly and simultaneously coupled to the common signal port. It may also be realized by coupling the first and second antenna to the common signal port via a signal routing device such as a frequency selective multiplexer or a switching device that selectively couples the first antenna or the second antenna to the common signal port. The switching device may be configured to selectively couple either the first antenna or the second antenna to the common signal port. The switching device may be configured as a microwave switch. Frequency selectivity may also be realized by coupling the first antenna via a first filter and/or the second antenna via a second filter to the common signal port, wherein the first filter passes the first frequency band and blocks the second frequency band and wherein the second filter passes the second frequency band and blocks the first frequency band.

The first and second antenna may also be serially coupled to the common signal, wherein at least one frequency filter is coupled between the first and second antenna. The filter may block the first radar signal and only transduce the second radar signal. The first antenna may then be configured to only transduce the first radar signal, or it may be configured to transduce both the first and second radar signal.

The antenna device may be configured to only transduce the first radar signal and not the second radar signal via the first antenna by suppressing transduction of the second radar signal compared to the first radar signal by at least 10 dB, at least 20 dB, at least 30 dB, at least 40 dB, or at least 50 dB. Likewise, the antenna device may be configured to only transduce the second radar signal and not the first radar signal via the second antenna by suppressing transduction of the first radar signal compared to the second radar signal by at least 10 dB, at least 20 dB, at least 30 dB, at least 40 dB, or at least 50 dB.

In general, each signal port of the radar circuit may be configured as common signal port and each common signal port may be connected to one of the first antennas and to one of the second antennas. The common signal ports are then configured to route the first radar signal transduced via their respective first antenna as a first signal component occupying the first frequency band and the second radar signal transduced via their respective second antenna as a second signal component occupying the second frequency band.

This effectively doubles the number of antennas that may be connected to the radar circuit.

The signal processing device may be configured to separate the first radar signal and the second radar signal from each port signal received via a common signal port, for example by filtering out the first frequency band to obtain the first radar signal and by filtering out the second frequency band to obtain the second radar signal. Filtering may be performed by analog filtering prior to sampling and/or by digital filtering after sampling.

According to an embodiment, a phase center of the first antenna coupled to the common signal port coincides with a phase center of the second antenna coupled to the common signal port. The first antenna may the constitute the first reference antenna and the second antenna the second reference antenna to establish the first and second reference propagation channel for determining the additional frequency induced phase shift between the first and second propagation channels.

According to an embodiment, a phase center of the first antenna coupled to the common signal port is shifted with respect to a phase center of the second antenna coupled to the common signal port. Therefore, the first and second antenna may be used to establish first and second propagation channels that exhibit a propagation delay that depends on the angular position of the target objects.

In general, the radar circuit may have a common signal port that is coupled to a first and second antenna having the same phase center and one or more further common signal ports that are each coupled to first and second antennas having phase centers that are shifted with respect to each other.

According to an embodiment, at least one of the first antennas is coupled to a first integrated circuit of the radar circuit for transceiving its respective first radar signal and at least one of the second antennas is coupled to a second integrated circuit of the radar circuit for transceiving its respective second radar signal. The first and second integrated circuit may be configured to transmit the respective first and second radar signal at the same time. For example, the first and second integrated circuit may have synchronized triggers for transmitting the respective first and second radar signal.

The first integrated circuit may be configured to transceive all first radar signals and the second integrated circuit may be configured to transceive all second radar signals. The integrated circuits may be configured to transmit the first and second radar signals at the same time. They each may have one signal port for every first or second radar signal. Additionally, they may comprise binary phase shifters at each transmit signal port. The phase shifters may be used to generate separability parameters based on binary phase shift keying and they may employ phase codes that allow for mutually separable or orthogonal codes among the radar signals transmitted via their respective transmit signal ports. The first integrated circuits may operate in the first frequency band and the second integrated circuit may operate in the second frequency band.

In another aspect, the present disclosure is directed at a vehicle with a radar device according to the present disclosure. Therefore, all effects and embodiments that are described in connection with the radar device also pertain to the vehicle comprising the radar device and vice versa.

In another aspect, the present disclosure is directed at a method for operating a radar device for automotive applications, the radar device comprising a radar circuit for transceiving radar signals, an antenna device for transducing the radar signals and a signal processing device for processing the radar signals, wherein the antenna device comprises a first set of first antennas and a second set of second antennas. The method includes transceiving, with the radar circuit first radar signals that occupy a first frequency band and second radar signals that occupy a second frequency band, transducing the first radar signals via the first antennas and not via the second antennas and the second radar signals via the second antennas and not via the first antennas, and detecting, with the signal processing device, from the first radar signals target reflections via first propagation channels and from the second radar signals target reflections via second propagation channels. The method further includes jointly evaluating, with the signal processing device, the target reflections via the first and second propagation channels to form a common virtual antenna array for determining an angular position of a target object irradiated by the antenna device.

The method may be performed by the radar device according to the present disclosure. Therefore, all effects and embodiments that are described in connection with the radar device also pertain to the method according to the present disclosure and vice versa.

BRIEF DESCRIPTION OF THE DRAWINGS

Exemplary embodiments and functions of the present disclosure are described herein in conjunction with the following drawings, showing schematically:

FIG. 3 transmissions of the first and second antennas;

FIG. 4 port signals generated by a signal generator of the radar device;

DETAILED DESCRIPTION

Figure 1:
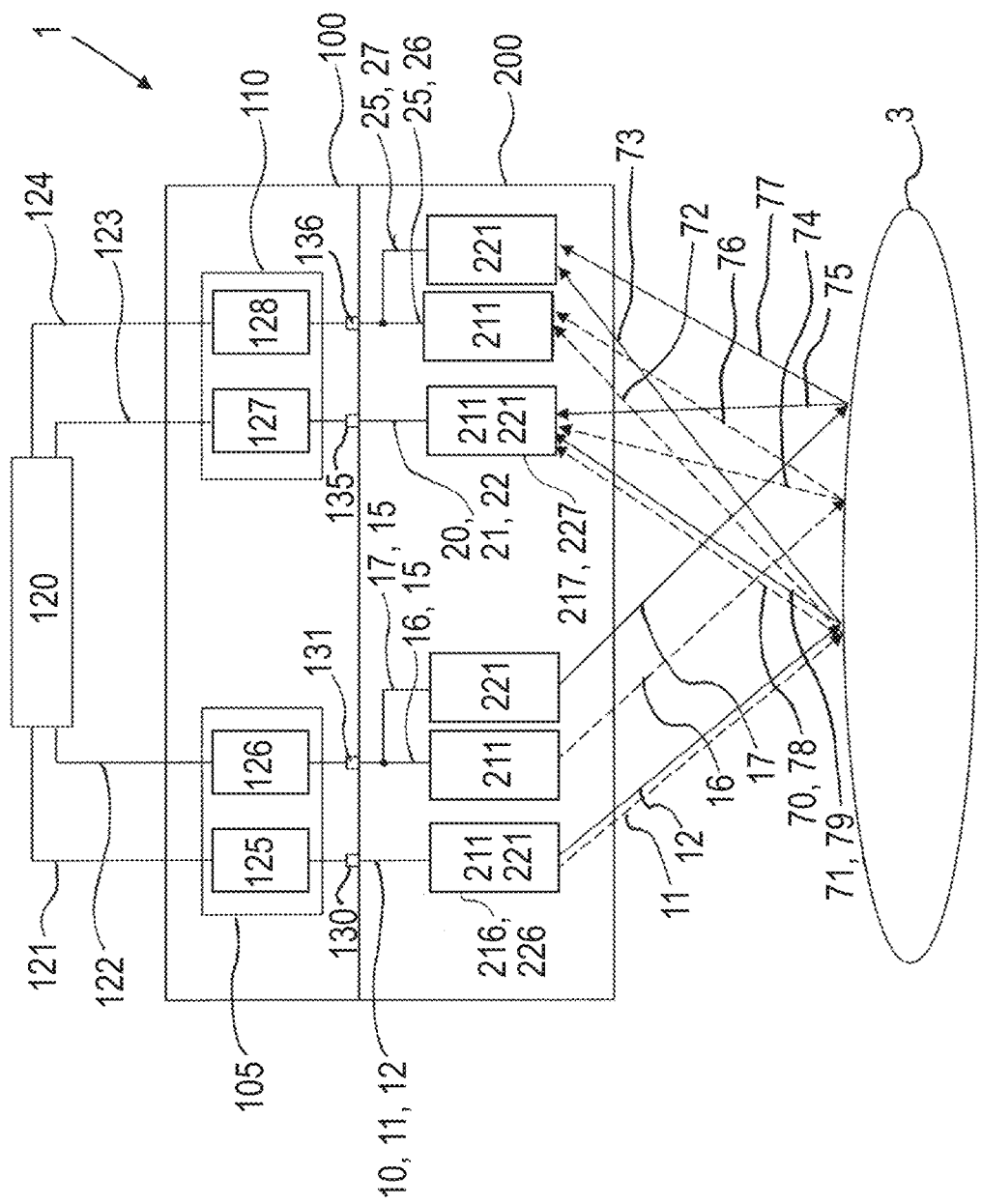
FIG. 1 a radar device according to the present disclosure.

FIG. 1 depicts a radar device 1 having a radar circuit 100, an antenna device 200 and a signal processing device 120. The radar circuit 100 comprises a signal generator 105 having a first transmit chain 125 and a second transmit chain 126. The first transmit chain 125 is coupled to a first common transmit signal port 130 and the second transmit chain 126 is coupled to a second common transmit signal port 131.

Each common transmit signal port 130, 131 is coupled to a first antenna 211 and a second antenna 221 of the antenna device 200. The first antenna 211 and the second antenna 221 coupled to the first common transmit signal port 130 have coinciding phase centers so that the first and second antenna 211, 221 transduce at the same position on the antenna device 200. The first antenna 211 and the second antenna 221 that are coupled to the second common transmit signal port 131 have phase centers that are shifted with respect to each other so that the corresponding first and second antenna 211, 221 are placed at different locations on the antenna device 200.

The first transmit chain 125 is connected to the signal processing device 120 to receive a first control signal 121 and the second transmit chain 126 is connected to the signal processing device 120 to receive a second control signal 122. Based on the first control signal 121, the first transmit chain 125 generates a first transmit port signal 10 comprising a first signal portion 11 occupying a first frequency band and a second signal portion 12 occupying a second frequency band. The first transmit port signal 10 is routed via the first common transmit signal port 130 to the antenna device 200 and the antenna device 200 is configured to transduce the first signal portion 11 of the first transmit port signal 10 as a first radar signal via the first antenna 211 coupled to the first common transmit signal port 130 and to transduce the second signal portion 12 of the first transmit port signal 10 as a second radar signal via the second antenna 221 coupled to the first common transmit signal port 130.

Based on the second control signal 122, the second transmit chain 126 generates a second transmit port signal 15 comprising a first signal portion 16 occupying the first frequency band and a second signal portion 17 occupying the second frequency band. The second transmit port signal 15 is routed via the second common transmit signal port 131 to the antenna device 200 and the antenna device 200 is configured to selectively transduce the first signal portion 16 of the second transmit port signal 15 as a first radar signal via the first antenna 211 coupled to the second common transmit signal port 131 and to selectively transduce the second signal portion 17 of the second transmit port signal 15 as a second radar signal via the second antenna 221 coupled to the second common transmit signal port 131.

The individual first signal portions 11, 16 of the first and second transmit port signal 10, 15 are radiated by the individual first antennas 211 towards a target object 3 and the individual second signal portions 12, 17 of the first and second transmit port signal 10, 15 are radiated by the individual second antennas 221 towards the target object 3. The target object 3 reflects the signal portions 11, 12, 16, 17 of the first and second transmit port signal 10, 15 at least partly back to the antenna device 200.

At the antenna device 200, the first signal portions 11, 16, which occupy the first frequency band, are transduced by two separated first antennas 211 and the second signal portions 12, 17, which occupy the second frequency band, are transduced by two separated second antennas 221. The antenna device 200 is configured to selectively transduce the first signal portions 11, 16 via the first antennas 211 and not via the second antennas 221 and to selectively transduce the second signal portions 12, 17 via the second antennas 221 and not via the first antennas 211.

One of the first antennas 211 and one of the second antennas 221 are coupled via a first common receive signal port 135 to a first receive chain 127 of a signal receiver 110 of the radar circuit 100. Likewise, the other one of the first antennas 211 and the other one of the second antennas 221 are coupled via a second common receive signal port 136 to a second receive chain 128 of the signal receiver 110. The first antenna 211 and the second antenna 221 that are coupled to the first common receive signal port 135 have coinciding phase centers, whereas the first antenna 211 and the second antenna 221 that are coupled to the second common receive signal port 136 have separate phase centers that are located at different positions on the antenna device 200.

The antenna device 200 routes a first signal portion 21 of a first receive port signal 20 from the first antenna 211 that is coupled to the first common receive signal port 135 and a second signal portion 22 of the first receive port signal 20 from the second antenna 221 that is coupled to the first common receive signal port 135 via the first common receive signal port 135 to the first receive chain 127. The antenna device 200 further routes a first signal portion 26 of a second receive port signal 25 from the first antenna 211 that is coupled to the second common receive signal port 136 and a second signal portion 27 of the second receive port signal 25 from the second antenna 221 that is coupled to the second common receive signal port 136 via the second common receive signal port 136 to the second receive chain 128.

The first signal portion 21 of the first receive port signal 20 comprises the fractions of the first signal portions 11, 16 of the first and second transmit port signals 10, 15 that are received by the first antenna 211 coupled to the first common receive signal port 135. The second signal portion 22 of the first receive port signal 20 comprises the fractions of the second signal portions 12, 17 of the first and second transmit port signals 10, 15 that are received by the second antenna 221 coupled to the first common receive signal port 135.

Likewise, the first signal portion 26 of the second receive port signal 25 comprises the fractions of the first signal portions 11, 16 of the first and second transmit port signals 10, 15 that are received by the first antenna 211 coupled to the second common receive signal port 136. The second signal portion 27 of the second receive port signal 25 comprises the fractions of the second signal portions 12, 17 of the first and second transmit port signals 10, 15 that are received by the second antenna 221 coupled to the second common receive signal port 136.

The first receive chain 127 generates a first radar data signal 123 that represents the first port signal 20 received from the first common receive signal port 135 and the second receive chain 128 generates a second radar data signal 124 that represents the second port signal 25 received from the second common receive signal port 136. The signal receiver 110 is connected to the signal processing device 120 and the first and second radar data signal 123, 124 are transferred from the signal receiver 110 to the signal processing device 120.

With the radar device 1 shown in FIG. 1, each antenna 211, 221 is connected via a single signal port 130, 131, 135, 136 to the radar circuit 100. The individual signal portions 11, 12, 16, 17, 21, 22, 26, 27 of the port signals 10, 15, 20, 25 then constitute individual radar signals, each radar signal being transduced by a separate antenna 211, 221. The signal portions 11, 16, 21, 26 transduced via the first antennas 211 constitute first radar signals and the signal portions 12, 17, 22, 27 transduced via the second antennas 221 constitute second radar signals.

The first transmit chain 125 and the second transmit chain 126 generate the respective first portions 11, 16 of the first transmit port signal 10 and the second transmit port signal 15 having different values of a first separability parameter and they generate the respective second portions 12, 17 of the first transmit port signal 10 and the second transmit port signal 15 having different values of a second separability parameter. Using the first separability parameter, the signal processing device 120 is able to separate the parts of the first signal portions 21, 26 of the first and second receive port signal 20, 25 that originate from the first portion 11 of the first transmit port signal 10 from the parts of the first signal portions 21, 26 of the first and second receive port signal 20, 25 that originate from the first portion 16 of the second transmit port signal 15. Likewise, the signal processing device 120 uses the second separability parameter to separate the parts of the second signal portions 22, 27 of the first and second receive port signal 20, 25 that originate from the second portion 12 of the first transmit port signal 10 from the parts of the second signal portions 22, 27 that originate from the second portion 17 of the second transmit port signal 15.

Additionally, the signal processing device 120 separates the first signal portion 21 and the second signal portion 22 of the first receive port signal 20 using the separate frequency bands of the first and second signal portions 21, 22 received via the first common receive signal port 135 and the signal processing device 120 separates the first signal portion 26 and the second signal portion 27 of the second receive port signal 25 using the separate frequency bands of the first and second signal portions 25, 26 received via the second common receive signal port 136.

The first antennas 211 transduce electromagnetic radiation with a first polarization and the second antennas 221 transduce electromagnetic radiation with a second polarization that is orthogonal to the first polarization. For example, the first antennas 211 may transduce electromagnetic radiation with horizontal linear polarization and the second antennas 221 may transduce electromagnetic radiation with vertical linear polarization, or vice versa.

The radar device 1 establishes a total of eight different propagation channels from the antenna device 200 to the target object 3 and back to the antenna device 200 and the signal processing device 120 is configured to separately detect the target reflections propagating via the individual propagation channels and to establish a virtual array in a MIMO configuration. Among the eight different propagation channels, a set of first propagation channels is operating in the first frequency band and a set of second propagation channels is operating in the second frequency band.

The radar device 1 establishes a propagation channel 70 from the first antenna 211 coupled to the first common transmit signal port 130 to the first antenna 211 coupled to the first common receive signal port 135, a propagation channel 71 from the second antenna 221 coupled to the first common transmit signal port 130 to the second antenna 221 coupled to the first common receive signal port 135, a propagation channel 72 from the first antenna 211 coupled to the first common transmit signal port 130 to the first antenna 211 coupled to the second common receive signal port 136, and a propagation channel 73 from the second antenna 221 coupled to the first common transmit signal port 130 to the second antenna 221 coupled to the second common receive signal port 136.

The radar device 1 further establishes a propagation channel 74 from the first antenna 211 coupled to the second common transmit signal port 131 to the first antenna 211 coupled to the first common receive signal port 135, a propagation channel 75 from the second antenna 221 coupled to the second common transmit signal port 131 to the second antenna 221 coupled to the first common receive signal port 135, a propagation channel 76 from the first antenna 211 coupled to the second common transmit signal port 131 to the first antenna 211 coupled to the second common receive signal port 136, and a propagation channel 77 from the second antenna 221 coupled to the second common transmit signal port 131 to the second antenna 221 coupled to the second common receive signal port 136.

The set of first propagation channels operating in the first frequency band is established by the first signal portions transduced via the first antennas 211. It comprises all propagation channels 70, 72, 74, 76 that are established between the first antennas 211. The set of second propagation channels is established by the second signal portions transduced via the second antennas 221. It comprises all propagation channels 71, 73, 75, 77 that are established between the second antennas 221.

The first transmit antenna 211 coupled to the first transmit signal port 130 constitutes a first reference transmit antenna 216 and the second transmit antenna 221 coupled to the first transmit signal port 130 constitutes a second reference transmit antenna 226. Furthermore, the first receive antenna 211 coupled to the first receive signal port 135 constitutes a first reference receive antenna 217 and the second receive antenna 221 coupled to the first receive signal port 135 constitutes a second reference receive antenna 227.

The propagation channel 70 established between the first reference transmit antenna 216 and the first reference receive antenna 217 constitutes a first reference propagation channel 78 and the propagation channel 71 between the second reference transmit antenna 226 and the second reference receive antenna 227 constitutes a second reference propagation channel 79. Since the first and second reference transmit antenna 216, 226 coupled to the first transmit signal port 130 have coinciding phase centers and since the first and second reference receive antenna 217, 227 coupled to the first common receive signal port 135 also have coinciding phase centers, the first reference propagation channel 78 has the same path length as the second reference propagation channel 79. Therefore, any differential phase shift between the first radar signal 11, 21 propagating via the first reference propagation channel 78 and the second radar signal 12, 22 propagating via the second reference propagation channel 79 does not result from different path lengths of the respective propagation channels 70, 71. This allows determining an additional phase difference caused by the different frequency bands of the first and second radar signal 11, 12, 21, 22.

Apart from this additional phase difference due to the different frequency bands, the signal processing device 120 is configured to determine further contributions to a total differential phase shift between the first and second reference propagation channel 78, 79. These further contributions include an angle-dependent phase shift $\Delta\varphi\_AZ$ due to an angular position of the target object 3 in a first, azimuthal direction and an angle-dependent phase shift $\Delta\varphi\_EL$ due to an angular position of the target object 3 in a second, elevation direction. Both phase shifts $\Delta\varphi\_AZ$ and $\Delta\varphi\_EL$ are caused by differences in the radiation patterns of the first reference transmit antenna 216 and the second reference transmit antenna 226, as well as by differences in the radiation patterns of the first reference receive antenna 217 and the second reference receive antenna 227.

The further contributions to the total differential phase shift also include a range-dependent phase shift $\Delta\varphi\_RANGE$ caused by a change of the distance to the target object 3 in between target reflections of the first signal portion 11 and the second signal portion 12. Finally, the further contributions include a global phase offset $\Delta\varphi\_GL$ caused by different phase values of a reference oscillator of the radar circuit 100 upon generation of the first and second signal portions 11, 12.

Alternative embodiments of the radar device 1 shown in FIG. 1 may comprise more than two transmit chains 125, 126 and common transmit signal ports 130, 131, for example three transmit chains and three associated transmit signal ports, as well as more than two receive chains 127, 128 and common receive signal ports 135, 136, for example four receive chains and four associated receive signal ports. To each signal port, a first antenna 211 and a second antenna 221 may be coupled and the individual port signals routed via the individual signal ports may each comprise a first signal portion occupying the first frequency band and a second frequency portion occupying the second frequency band. The antenna device 200 may then be configured to transduce the individual first signal portions as first radar signals via the first antennas 211 and the individual second signal portions as second radar signals via the second antennas 221. The individual first signal portions may differ among each other at least in a first separability parameter and the individual second signal portions may differ among each other at least in the second separability parameter.

Figure 2:
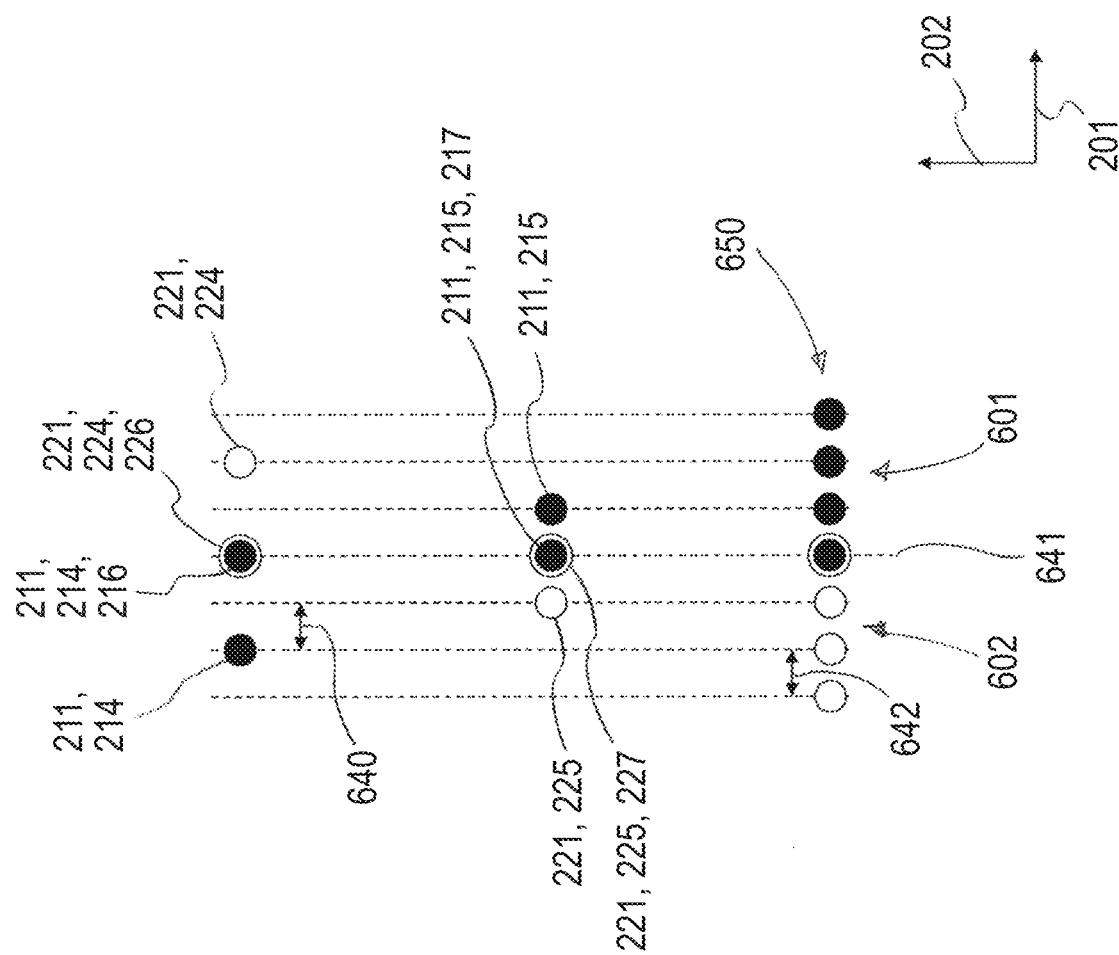
FIG. 2 a placement of first and second antennas of the radar device.

FIG. 2 schematically shows an exemplary placement of the first and second antennas 211, 221 on the antenna device 200. The first transmit antennas 214 and the second transmit antennas 224 are placed next to each other along a first direction 201. Likewise, the first receive antennas 215 and the second receive antennas 225 are also placed next to each other along the first direction 201. The individual transmit antennas 214, 224 have the same position along a second direction 202 that is perpendicular to the first direction 201 and the individual receive antennas 215, 225 also have the same position along the second direction 202. Thereby, the positions of the individual antennas 211, 221 are defined by their respective phase centers when transducing within the first or second frequency band, respectively. These positions correspond to MIMO-positions that define the different phase differences acquired upon propagation via the individual propagation channels 70, 71, 72, 73, 74, 75, 76, 77, 78, 79.

The first and second reference receive antenna 217, 227 are located at a reference position 641 along the first direction 201 and the remaining receive antennas 215, 225 are placed next to each other having a distance 640 in between them. The distance 640 may amount to, for example, a reference wavelength of radiation having a reference frequency within the first frequency band, the second frequency band or in between the first and second frequency band. For example, the reference frequency may be a center frequency in between the first and second frequency band. The first and second reference transmit antenna 216, 226 are also located at the reference position 641 along the first direction 201. The remaining transmit antennas 214, 224 are placed next to each other and spaced apart from each other by two times the distance 640. Therefore, a spacing between the transmit antennas 214, 224 along the first direction 201 amounts to k-times the distance 640 between the receive antennas 215, 225, with k being the number of receive antennas 215, 225.

Along the first direction 201, the first transmit antennas 214 and the first receive antennas 215 are placed at opposite sides from the reference position 641. Likewise, the second transmit antennas 224 and the second receive antennas 225 are placed at opposite sides from the reference position 641 along the first direction 201. Additionally, the first and second transmit antennas 214, 224 are placed at opposite sides from the reference position 641 along the first direction 201 and the first and second receive antennas 215, 225 are also placed at opposite sides from the reference position 641 along the first direction 201.

The signal processing device 120 is configured to form a common virtual antenna array 650 from the individual propagation channels 70, 71, 72, 73, 74, 75, 76, 77 established between the first and second antennas 211, 221. The virtual antenna array 650 is schematically depicted in FIG. 2. The virtual antenna array 650 comprises a set of first virtual antennas 601 corresponding to the first propagation channels 70, 72, 74, 76 and a set of second virtual antennas 602 corresponding to the second propagation channels 71, 73, 75, 77.

For each virtual antenna 601, 602, its distance from the reference position 641 along the first direction 201 corresponds to the relative distance between the transmit and receive antenna 614, 615, 624, 625 of its respective propagation channel 70, 71, 72, 73, 74, 75, 76, 77. Since the transmit antennas 214, 224 are spaced apart from each other by two times the distance 640 between the receive antennas 215, 225, all virtual antennas 601, 602 have an equal effective spacing 642 between them, the effective spacing 642 being equal to the distance 640.

FIG. 3 shows a first transmission 51 of the first antennas 211 versus frequency 30 and a second transmission 52 of the second antennas 221 versus frequency 30. The first transmission 51 exceeds a minimum transmission 42 in the first frequency band 31 between a first minimum frequency 32 and a first maximum frequency 33 and the second transmission 52 exceeds the minimum transmission 42 in the second frequency band 34 between a second minimum frequency 35 and a second maximum frequency 36.

The first minimum frequency 32 may amount to 75.5 GHz and the second maximum frequency 36 may amount to 81.5 GHz. The first maximum frequency 33 may amount to 77.5 GHz and the second minimum frequency 35 may amount to 79.5 GHz.

As can be seen from FIG. 3, the first frequency band 31 and the second frequency band 34 are separated from each other and do not overlap. Between the first and second frequency band 31, 34, a frequency gap is located that spans the frequencies between the first maximum frequency 33 and the second minimum frequency 35. The first signal portions 11, 16, 21, 26 of the port signals 10, 15, 20, 25 processed by the radar circuit 100 of the radar device 1 shown in FIG. 1 occupy the first frequency band 31 and the second signal portions 12, 17, 22, 27 of the port signals 10, 15, 20, 25 occupy the second frequency band 34. In alternative embodiments of the radar device 1, the frequency bands 31, 34 may be defined by two separate minimum transmissions that differ from each other.

FIG. 4 schematically shows the frequency 30 of the first and second port signal 10, 15 generated by the signal generator 105 of the radar device 1 over time 60. The frequency 30 of the port signals 10, 15 is repeatedly cycled through the second frequency band 34 and the first frequency band 31. In the exemplary embodiment shown in FIG. 4, the frequency 30 of the port signals 10, 15 is first linearly swept in the second frequency band 34 from the second maximum frequency 36 to the second minimum frequency 35 and is then linearly swept in the first frequency band 31 from the first maximum frequency 33 to the first minimum frequency 32. Subsequently, this cycle or burst is repeated.

In alternative embodiments, a different frequency sweep may be employed within the first frequency band 31 and/or within the second frequency band 34. For example, the frequency 30 may be swept from lower frequencies to higher frequencies. The frequency sweep may also start with a sweep over the first frequency band 31 instead of starting with the sweep over the second frequency band 34.

The individual frequency sweeps within the first and second frequency band 31, 34 constitute individual frequency chirps, from which propagation delays of the target reflections travelling via the individual propagation channels 70, 71, 72, 73, 74, 75, 76, 77 are deduced by the radar circuit 100 and the signal processing device 120.

Since the first antennas 211 transduce within the first frequency band 31 and the second antennas 221 transduce within the second frequency band 34, target reflections via the first propagation channels 70, 72, 74, 76 exhibit an additional phase difference with respect to target reflections via the second propagation channels 71, 73, 75, 77, wherein the additional phase difference is a frequency induced phase difference that results from the frequency difference between the first radar signals 11, 16, 21, 26 transduced via the first antennas 211 and the second radar signals 12, 17, 22, 27 transduced via the second antennas 221.

The signal processing device 120 is configured to determine the additional frequency induced phase difference and to compensate this phase difference over all propagation channels 70, 71, 72, 73, 74, 75, 76, 77 when forming the common virtual antenna array 650 by jointly evaluating the target reflections via the propagation channels 70, 71, 72, 73, 74, 75, 76, 77.

Figure 5:
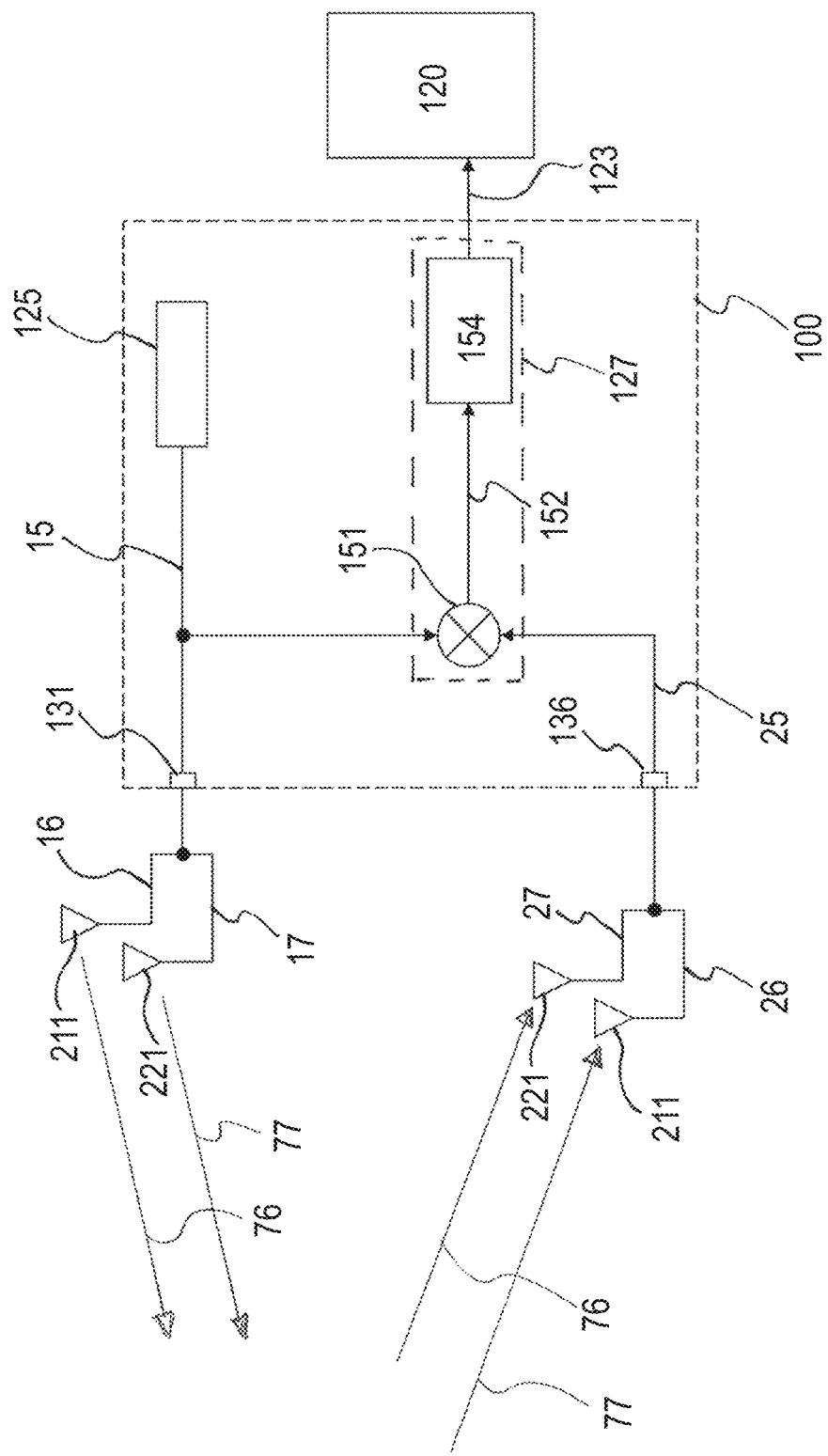
FIG. 5 parts of the radar device used to determine propagation delays from the individual port signals.

FIG. 5 schematically shows the parts of the radar device 1 used to determine the propagation delays from the individual frequency chirps of the port signals 15, 25 transduced via the propagation channels 76, 77 that are established by the first and second antennas 211, 221 coupled to the second transmit and receive signal port 131, 136.

The receive port signal 25, which contains the first and second signal portions 26, 27 transduced via the first and second receive antenna 211, 221 coupled to the receive signal port 136, respectively, is received by the receive chain 127 and subsequently compared with the instantaneous transmit port signal 15 transmitted via the first and second antenna 211, 221 that are coupled to the common transmit signal port 131. This comparison is done by mixing the receive port signal 25 with the instantaneous transmit port signal 15 with a mixing module 154. This creates an intermediate signal 152 at a difference frequency of the transmit and receive port signal 15, 25. Since the transmit and receive port signal 15, 25 comprise linear frequency chirps having the same slope, their frequency difference and thus the frequency of the intermediate signal 152 is constant in time. Furthermore, the frequency of the intermediate signal 152 is a measure for the range of the target object 3 reflecting the radar signals signal 16, 17, since any delay of the radar signals 16, 17 that is acquired during propagation between the radar device 1 and the target object 3 increases the instantaneous frequency difference between the receive port signal 25 and the transmit port signal 15 and thus the frequency of the intermediate signal 152.

The intermediate signal 152 is measured by a measurement module 154 of the receive chain 127. The measurement module 154 is configured as an analog-to-digital (ADC) converter and samples the intermediate signal 152 to generate a data signal 123 that represents the intermediate signal 152. The data signal 123 is received by the signal processing device 120 and the signal processing device 120 evaluates the data signal 123 to determine a position and velocity of the target object 3 from the data signal 123.

While FIG. 5 depicts signal evaluation for the first propagation channel 76 between the first antennas 211 and the second propagation channel 77 between the second antennas 221 connected to the second common transmit signal port 131 and the second common receive signal port 136, the radar device 1 is configured to evaluate the signals transmitted via the remaining propagation channels 70, 71, 72, 73, 74, 75 in the same manner. This means, that the receive port signal 20, 25 of each propagation channel 70, 71, 72, 73, 74, 75, 76, 77 is compared to the instantaneous transmit port signal 10, 15 of the respective propagation channel 70, 71, 72, 73, 74, 75, 76, 77 by mixing the two respective port signals 10, 15, 20, 25. The resulting intermediate signals 152 are subsequently evaluated by the signal processing device 120.

For the radar device 1 shown in FIG. 1, this results in four intermediate signals 152, one intermediate signal 152 for each combination of common transmit signal ports 130, 131 and common receive signal ports 135, 136. Each intermediate signal 152 represents propagation properties, such as propagation delay or phase shift, of one of the first propagation channels 70, 72, 74, 76 and one of the second propagation channels 71, 73, 75, 77. The propagation properties of all propagation channels 70, 71, 72, 73, 74, 75, 76, 77 are jointly evaluated by the signal processing device 120.

Figure 6:
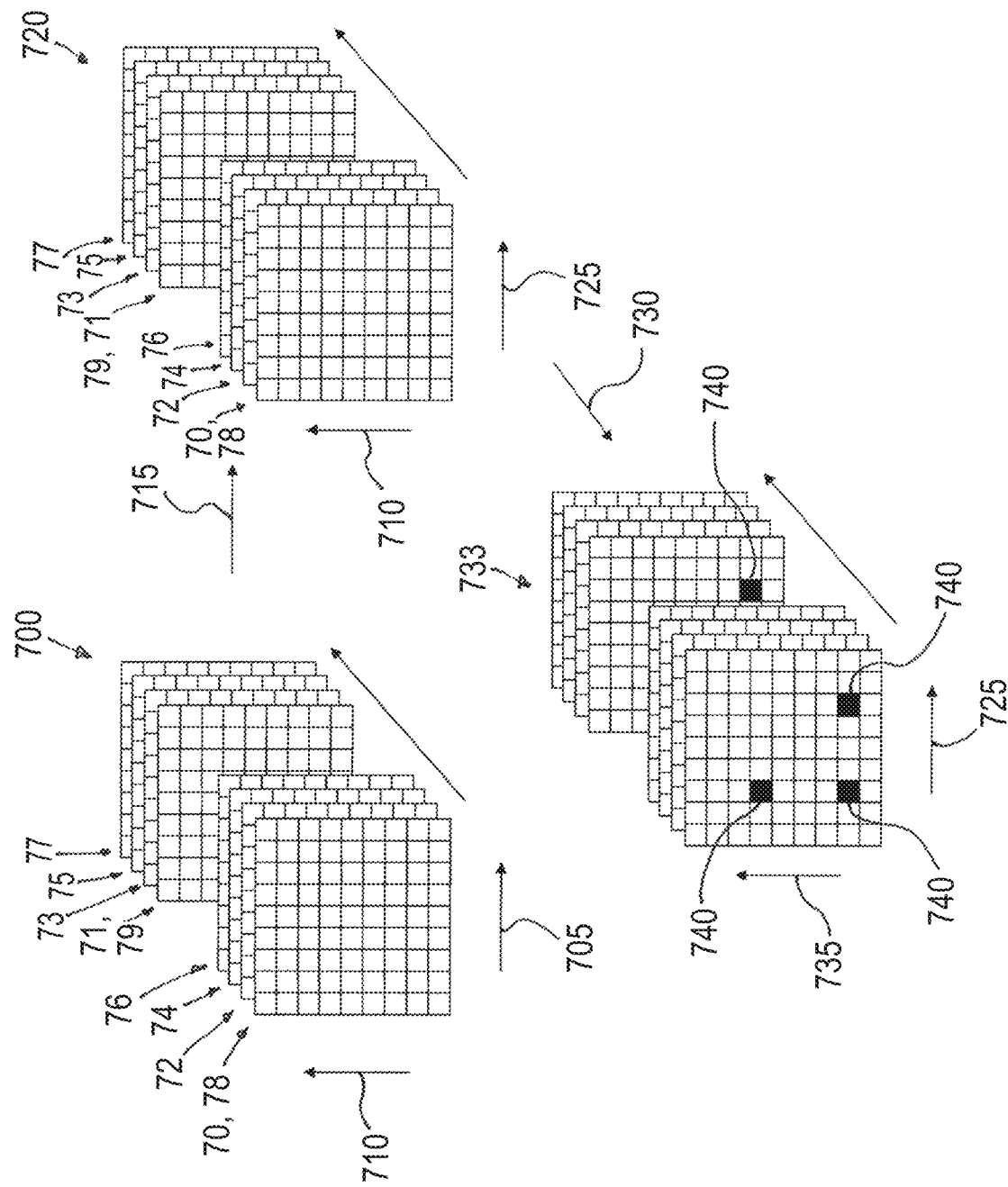
FIG. 6 evaluation of a data signal.

FIG. 6 schematically depicts evaluation of the data signal 125 corresponding to the individual propagation channels 70, 71, 72, 73, 74, 75, 76, 77 by the signal processing device 120.

The signal processing device 120 splits the intermediate signals 125 into individual signal parts, each signal part corresponding to the intermediate signal of one of the propagation channels 70, 71, 72, 73, 74, 75, 76, 77. The signal processing device 120 further divides the individual signal parts into portions that correspond to the individual frequency chirps that are transmitted over the respective propagation channels 70, 71, 72, 73, 74, 75, 76, 77. These data may be depicted, for each propagation channel 70, 71, 72, 73, 74, 75, 76, 77, in a first channel data matrix 700 with rows representing the individual chirps 710 and columns representing the individual samples 705 of the intermediate signal 125 corresponding to the individual chirps 710.

The signal processing device 120 first individually processes the intermediate signals 125 corresponding to the individual propagation channels 70, 71, 72, 73, 74, 75, 76, 77 by mapping the data of each individual first channel data matrix 700 into range bins 725, wherein the individual range bins 725 group the signals reflected at the same target distance from the radar device 1. This mapping is achieved by a row-wise Fourier transform 715, namely a FFT, on the individual first channel data matrices 700 of the propagation channels 70, 71, 72, 73, 74, 75, 76, 77. For each propagation channel 70, 71, 72, 73, 74, 75, 76, 77 this results in data that is represented by a second channel data matrix 720 with rows still representing the individual chirps 710 and columns representing the individual range bins 725. The row-wise Fourier transform 715 resolves the individual frequency components of the chirps 710, each frequency component corresponding to a specific target distance.

Subsequently, the signal processing device 120 maps the data values of the individual chirps 710 for each individual range bin 725 into velocity bins 735, wherein the individual velocity bins 735 group the signals reflected by targets 3 having the same target velocity. The mapping is performed by a column-wise Fourier transform 730, namely a column-wise FFT, on the individual second channel data matrices 720. This results in third channel data matrices 733 with columns representing individual range bins 725 and rows representing individual velocity bins 735. In alternative embodiments, compensating the phase differences determined from the first and second reference phases may also be performed after having transformed the signal data to the velocity bins 735 by the column-wise Fourier transform 730.

For each individual third channel data matrix 733, the signal processing device 120 determines target detections 740 by evaluating the signal strength of the individual range and velocity bins 725, 735 and comparing the signal strengths to a minimum signal strength indicating a reflecting target 3 having the corresponding range and velocity.

Each data entry of the third channel data matrices 733 is a complex value having an amplitude and a phase. The phases of the individual entries of the third channel data matrices 733 are evaluated by the signal processing device 120 to determine the velocity and the angular position of the target objects 3 reflecting the radar signals 11, 12, 16, 17. However, since the first radar signals 11, 16 propagating via the first propagation channels 70, 72, 74, 76 and the second radar signals 12, 17 propagating via the second propagation channels 71, 73, 75, 76 occupy different frequency ranges and since the first and second radar signals 11, 12, 16, 17 are intermittently transmitted and received with delays in between the transmissions, the phases of the entries of the third channel data matrices 733 additionally depend on whether the corresponding radar signals 11, 12, 16, 17 have been transmitted via a first propagation channel 70, 72, 74, 76 between first antennas 211 or via a second propagation channel 71, 73, 75, 77 between second antennas 221.

The signal processing device 120 is configured to compensate this dependency of the phase values on the propagation channels 70, 71, 72, 73, 74, 75, 76, 77. To this end, the signal processing device 120 first determines the phase shifts acquired via the propagation channel 71 forming the first reference propagation channel 78 as first reference phases and the phase shifts acquired via the propagation channel 72 forming the second reference propagation channel 79 as second reference phases.

Since the first and second reference propagation channel 78, 79 have the same propagation path between the radar device 1 and the target object 3, any difference between the first and second reference phases does not depend on different distances travelled by the reference signals 11, 12, 21, 22. Instead, such phase differences are caused by the different signal properties of the first reference signal 11, 21 transmitted via the first reference propagation channel 78 and the second reference signal 12, 22 transmitted via the second reference propagation channel 79. Additionally, they depend on the angle-dependent phase shift $\Delta\varphi\_AZ$ due to the angular position of the target object 3 in the first, azimuthal direction 201 and the angle-dependent phase shift $\Delta\varphi\_EL$ due to the angular position of the target object 3 in the second, elevation direction 202, on the range-dependent phase shift $\Delta\varphi\_RANGE$ and on the global phase offset $\Delta\varphi\_GL$.

To compensate for these phase differences between signals 11, 12, 16, 17 propagating via the first and second propagation channels 70, 71, 72, 73, 74, 75, 76, 77, the signal processing device 120 scales the phase values of the intermediate signals obtained from the second propagation channels 71, 73, 75, 77 by the ratio of the first reference phase to the second reference phase. This effectively results in the data entries of the third channel data matrices 733 being referenced to the signal properties of the first radar signals 11, 16, 21, 26 occupying the first frequency band 31.

In alternative embodiments, compensating the phase differences determined from the first and second reference phases may also be performed before transforming the signal data to the velocity bins 735 by the column-wise Fourier transform 730.

For each individual third channel data matrix 733, the signal processing device 120 determines target detections 740 by evaluating the signal strength of the individual range and velocity bins 725, 735 and comparing the signal strengths to a minimum signal strength indicating a reflecting target 3 having the corresponding range and velocity.

The angular positions of the target objects 3 represented by the target detections 740 are then determined by the signal processing device 120 from relative phase shifts between all target reflections propagating via the first and second propagation channels 70, 71, 72, 73, 74, 75, 76, 77. To this end, the signal processing device 120 maps those data values across all third channel data matrices 733 that correspond to the same target detection 740 to individual angle bins, the individual angle bins representing different angular positions of the detected target objects 3. The mapping is done by performing a matrix-wise Fourier transform, namely a matrix-wise FFT. This FFT then represents an angle-FFT.

Figure 7:
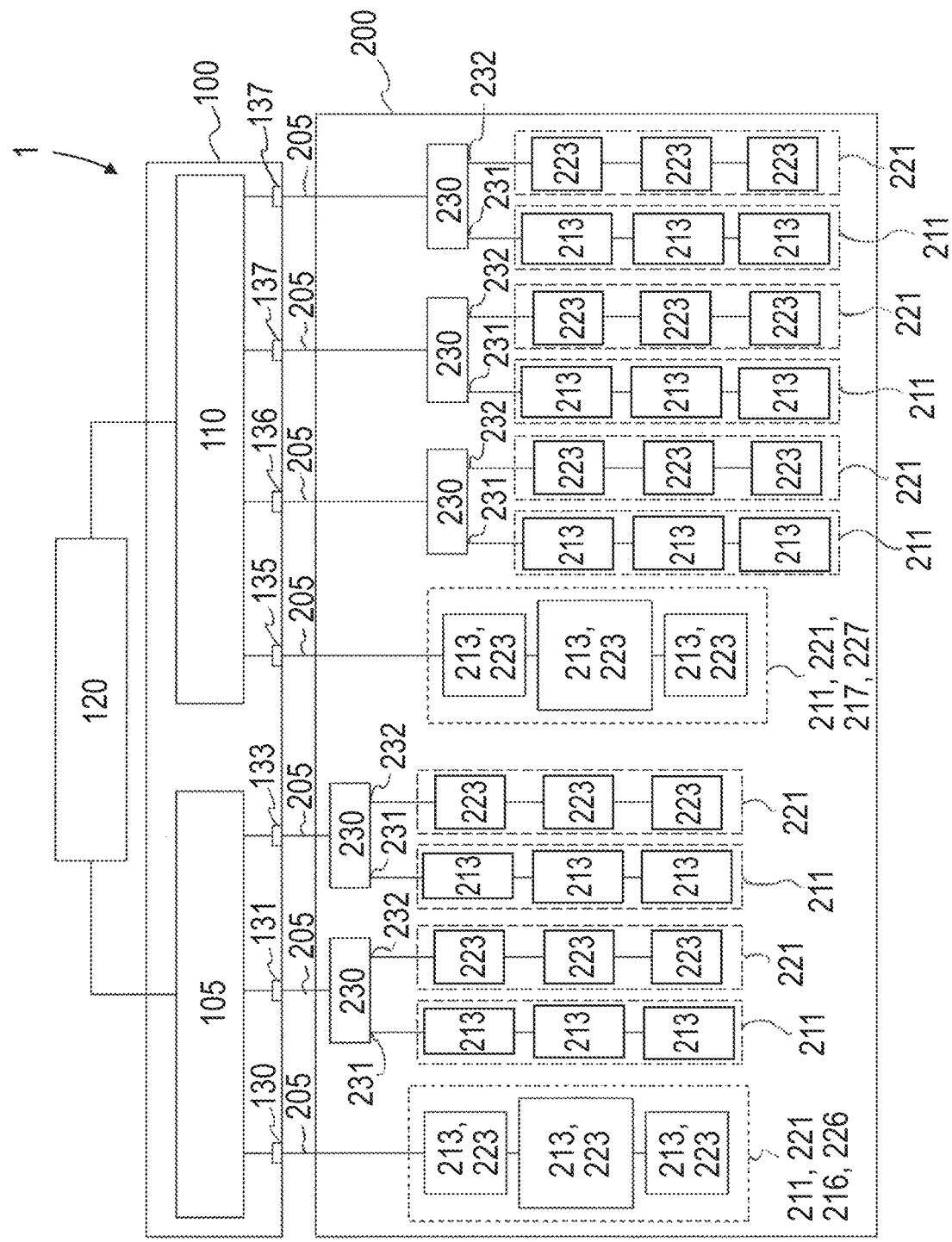
FIG. 7 a further embodiment of the radar device according to the present disclosure.

FIG. 7 shows a further embodiment of the radar device 1 according to the present disclosure. As far as no differences are apparent from the description or the Figures, the embodiment shown in FIG. 7 is configured as it is disclosed in connection with the embodiment shown in FIG. 1 and vice versa.

The radar circuit 100 of the radar device 1 shown in FIG. 7 in total has three transmit signal ports, namely a first transmit signal port 130, a second transmit signal port 131, and a further transmit signal port 133. The radar circuit 100 furthermore has four receive signal ports, namely a first receive signal port 135, a second receive signal port 136, and two further receive signal ports 137. Each signal port 130, 131, 133, 135, 136, 136 forms a common signal port to which a respective first antenna 211 and a respective second antenna 221 is connected.

Each first and second antenna 211, 221 is configured as a series-fed array antenna. The first antennas 211 each comprise a set of first antenna elements 213 and the second antennas each comprise a set of second antenna elements 223. The first and second antenna 211, 221 coupled to the first transmit signal port 130 of the radar device 1 form a first and second reference transmit antenna 216, 226, respectively, whereby the first and second reference transmit antenna 216, 226 have the same phase center. The first and second antenna 211, 221 coupled to the first receive signal port 135 form a first and second reference receive antenna 217, 227, respectively, whereby the first and second reference receive antenna 217, 227 also have the same phase center. The antenna elements 213 of the first reference transmit antenna 216 and the antenna elements 223 of the second reference transmit antenna 226 are formed as coinciding antenna elements 213, 223 that transduce in both the first and second frequency band 31, 34. Likewise, the antenna elements 213 of the first reference receive antenna 217 and the antenna elements 223 of the second reference receive antenna 227 are formed as coinciding antenna elements 213, 223 that transduce in both the first and second frequency band 31, 34.

The further first and second antennas 211, 221 coupled to the other signal ports 131, 133, 136, 137 all have phase centers that differ from each other. These antennas 211, 221 are coupled to the respective common signal ports 131, 133, 136, 137 via signal routing devices 230 that each have a first port 231 connected to the respective first antenna 211 and a second port 232 connected to the respective second antenna 221. The signal routing devices 230 are each connected via a common signal line 205 to their respective common signal port 131, 133, 135, 136, 137. The signal routing devices 230 selectively route the first signal portions of the port signals that are transduced via the first antennas 211 via the first port 231 and the common signal lines 205 and the second signal portions of the port signals that are transduced via the second antennas 221 via the second ports 232 and the common signal lines 205. The signal routing devices 230 may be configured as frequency dependent diplexers, switches, or the like.

Figure 8:
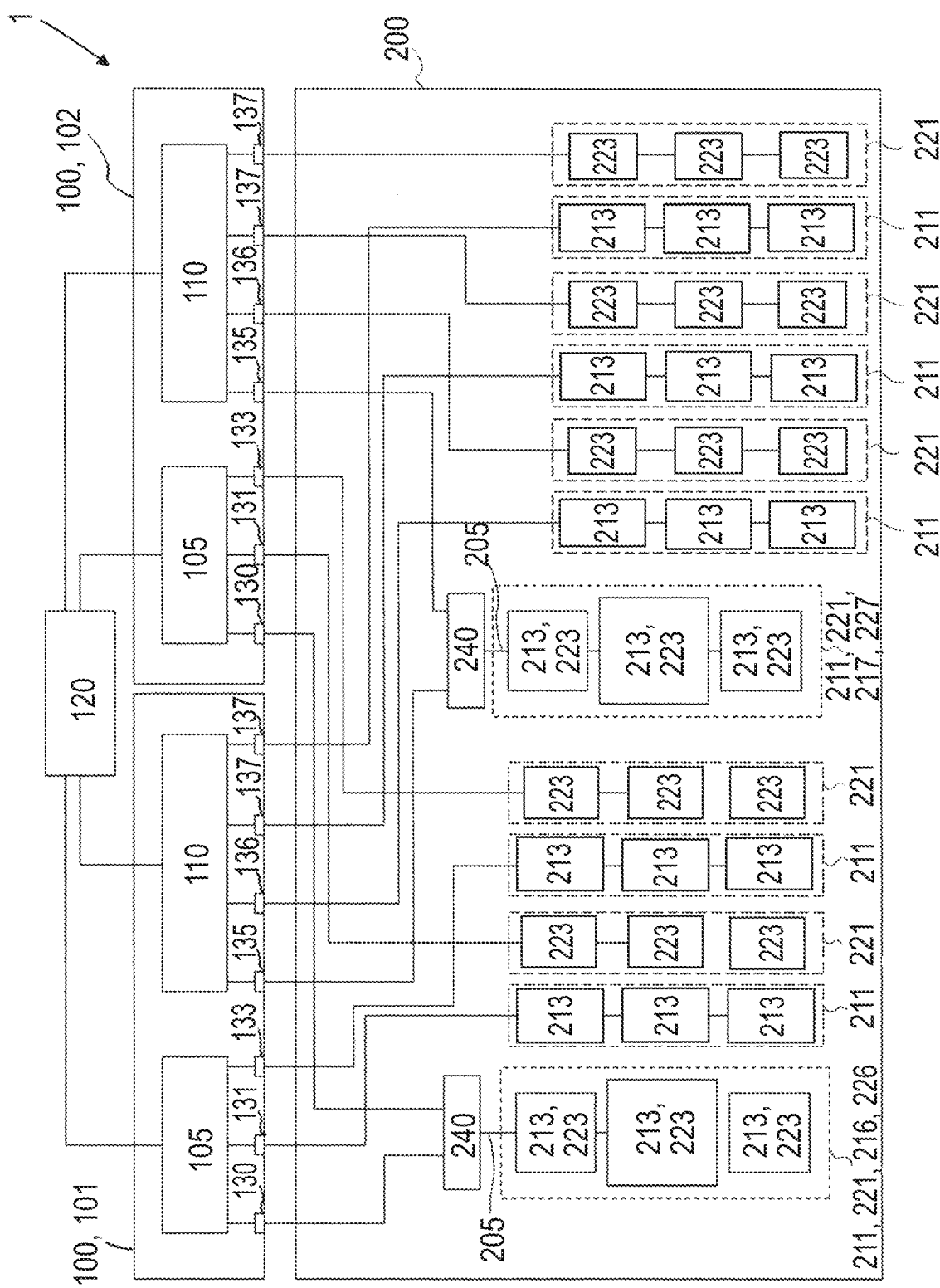
FIG. 8 a further embodiment of the radar device according to the present disclosure.

FIG. 8 shows an alternative embodiment of the radar device 1 according to the present disclosure. As far as no differences follow from the description or the Figures, the embodiment shown in FIG. 8 is configured as it is disclosed in connection with the embodiment shown in FIG. 7 and vice versa.

The radar circuit 100 of the radar device 1 shown in FIG. 8 comprises a first integrated circuit 101 and a second integrated circuit 102. Each integrated circuit 101, 102 comprises a signal generator 105 and a signal receiver 110. Each signal generator 105 is coupled to a first transmit port 130, a second transmit port 131 and a further transmit port 133 of its respective integrated circuit 101, 102 and each signal receiver 110 is coupled to a first receive port 135, a second receive port 136 and two further receive ports 137 of its respective integrated circuit 101, 102. Each individual port 130, 131, 133, 135, 136, 137 constitutes a physical external connection point of its respective integrated circuit 101, 102.

The first integrated circuit 101 is configured to simultaneously transceive the first radar signals transduced via the first antennas 211 and the second integrated circuit 102 is configured to transceive the second radar signals transduced via the second antennas 221. The first and second integrated circuit 101, 102 operate simultaneously and have synchronized triggers for transmitting the first and second radar signals. Additionally, the first and second integrated circuit 101, 102 comprise phase-coherently coupled reference oscillators.

The first integrated circuit 101 generates the first radar signals having a set of mutually independent phase codes as separability parameters and the second integrated circuit 102 generates the second radar signals having the same set of mutually independent phase codes. For generating the phase codes, the first and second integrated circuit 100, 102 comprise one binary phase shifter at each signal port 130, 131, 133, 135, 136, 137.

The first reference transmit antenna 216 and the second reference transmit antenna 226, which consist of the common antenna elements 213, 214, are coupled to the first transmit port 130 of the first integrated circuit 101 and the first transmit port 130 of the second integrated circuit 102 via a diplexer 240. The diplexer combines the first reference signal received from the first integrated circuit 101 and occupying the first frequency band 31 with the second reference signal received from the second integrated circuit 102 and occupying the second frequency band 34. Analogously, the first reference receive antenna 217 and the second reference receive antenna 227, which also consist of common antenna elements 213, 223, are coupled to the first receive port 135 of the first integrated circuit 101 and the first receive port 135 of the second integrated circuit 102 via another diplexer 240. This diplexer 240 splits the signal components of the first reference signal from the signal components of the second reference signal and guides the signal components of the first reference signal to the first receive port 135 of the first integrated circuit 101 and the signal components of the second reference signal to the first receive port 135 of the second integrated circuit 102.

The remaining first transmit antennas 211 are individually coupled to the second and further transmit signal ports 131, 133 of the first integrated circuit 101 and the remaining first receive antennas 211 are also individually coupled to the second and further receive signal ports 136, 137 of the first integrated circuit 101. Likewise, the remaining second transmit antennas 221 are individually coupled to the second and further transmit signal ports 131, 133 of the second integrated circuit 102 and the remaining second receive antennas 221 are individually coupled to the second and further receive signal ports 136, 137 of the second integrated circuit 102.

Figure 9:
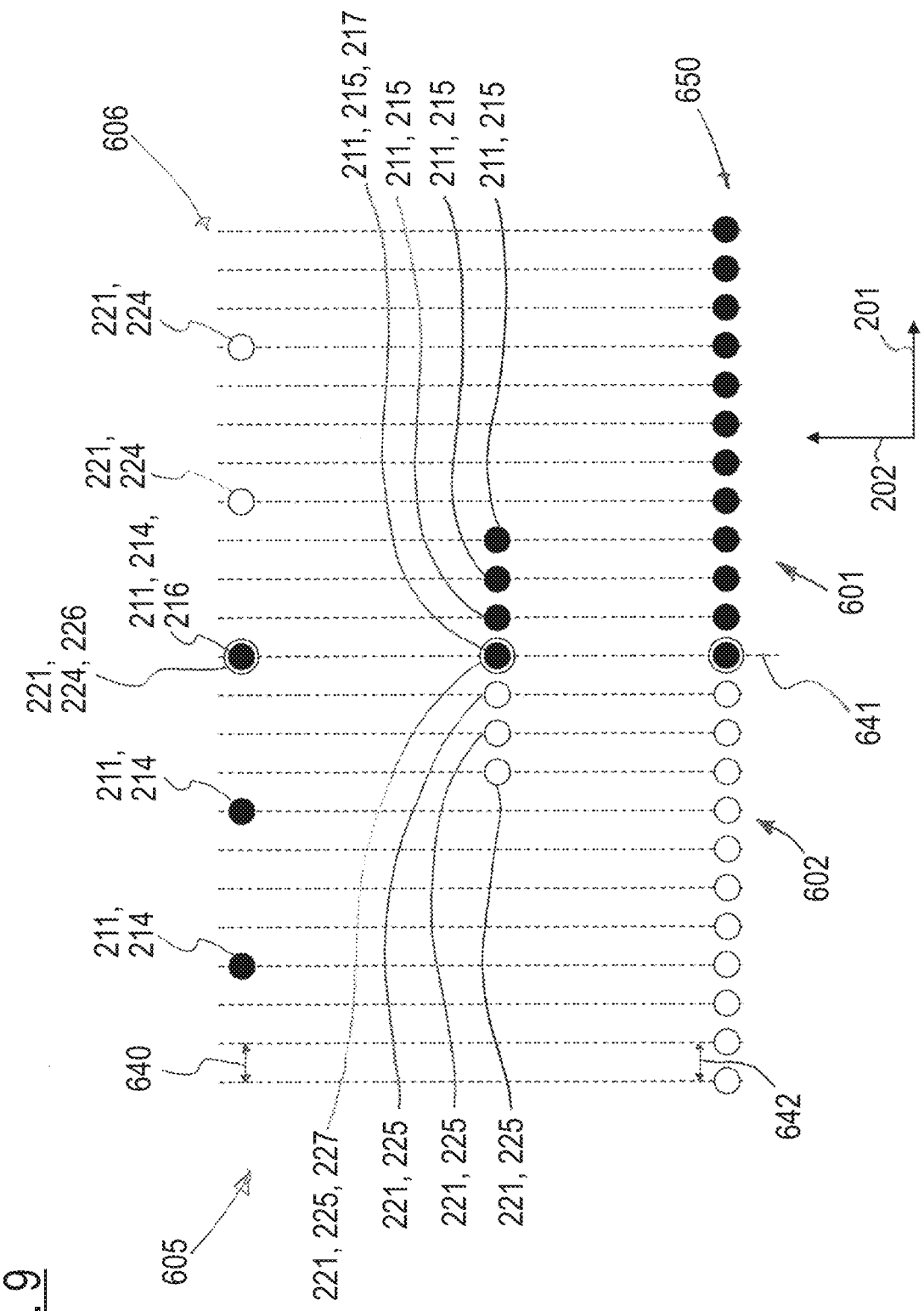
FIG. 9 a placement of antennas of the radar devices shown in FIGS. 7 and 8.

FIG. 9 shows an exemplary placement of the antennas 211, 221 of the radar devices 1 shown in FIGS. 7 and 8. The transmit antennas 214, 224 form a linear transmit array placed along the first direction 201 with the coinciding first and second reference transmit antenna 216, 226 being placed at the center of the transmit array at a reference position 641. The first transmit antennas 214 are placed in the first direction 201 at a first side 605 from the reference position 641 and the second receive antennas 224 are placed at an opposing second side 606 from the reference position 641. Furthermore, the receive antennas 215, 225 are placed in a linear receive array along the first direction 201 with the coinciding first and second reference receive antenna 217, 227 being located at the reference position 641. The first receive antennas 215 are placed along the first direction 601 on the second side 606 from the reference position 641 and the second receive antennas 225 on the first side 605.

The transmit antennas 214, 224 are spaced apart from each other by four times the distance 640 between the receive antennas 215, 225. The common virtual antenna array 650 that is established by the first and second propagation channels between the antennas 214, 215, 216, 226 then comprises virtual antennas 601, 602 that have an effective spacing 642 in between them which corresponds to the distance 640 between the receive antennas 215, 225.

Figure 10:
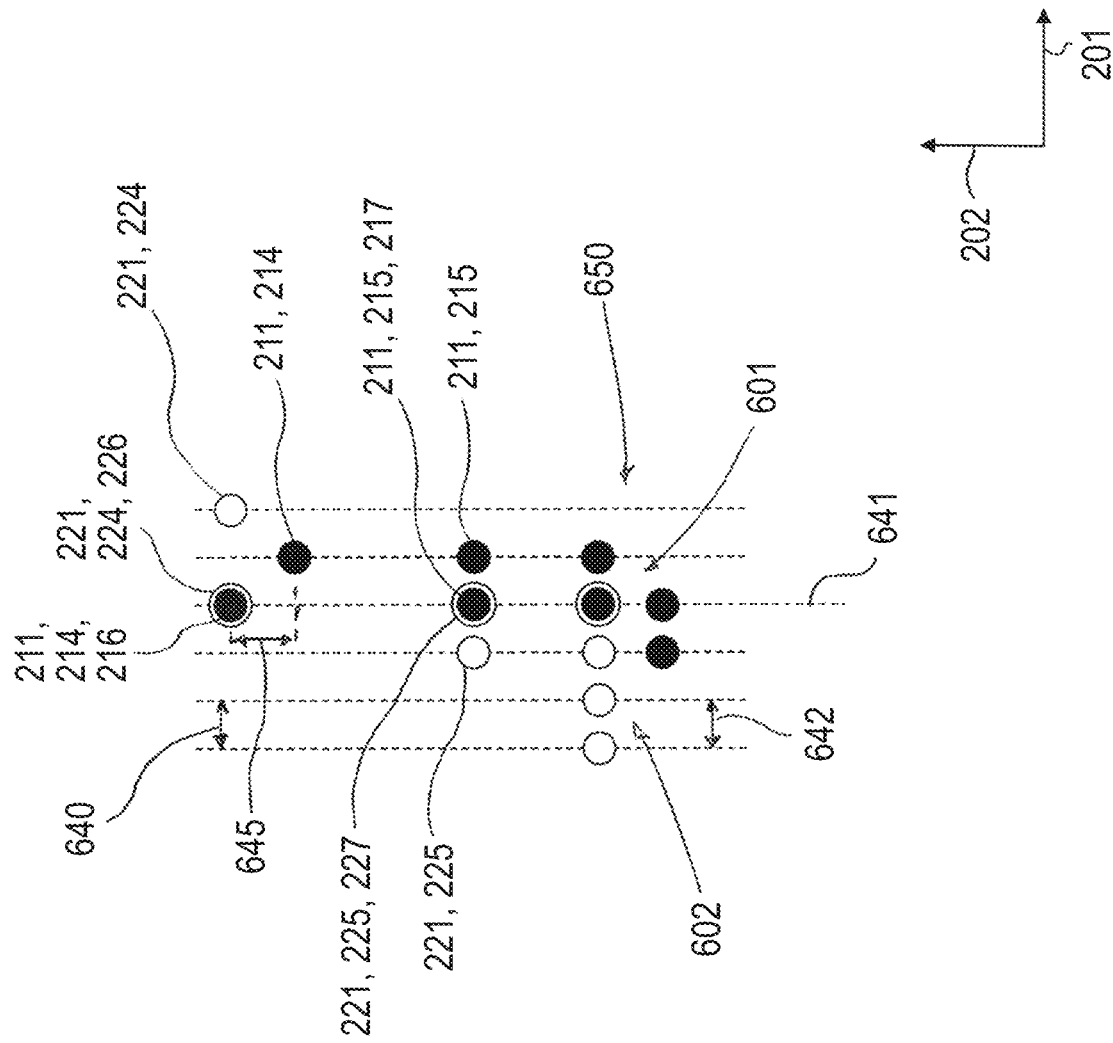
FIG. 10 an alternative placement of the antennas of the radar device shown in FIG. 1.

FIG. 10 schematically depicts an alternative placement of the first and second antennas 211, 221 of the radar device 1 shown in FIG. 1. As far as now differences are described or apparent from the figures, the placement shown in FIG. 10 is configured as it is disclosed for the placement shown in FIG. 2 and vice versa.

With the placement shown in FIG. 10, the first and second reference transmit antenna 216, 226 coincide and are placed at the reference position 641 along the first direction 201. The further first transmit antenna 214 is shifted with respect to the reference antennas 216, 217 along the first direction 201 by a distance 640 and along the second direction 202 by a further distance 645. This results in the first virtual antennas 601 of the virtual antenna array 650 being located in individual rows that extend along the first direction 201 and are shifted with respect to each other along the second direction 202 by the further distance 645. When jointly evaluating the first and second propagation channels established between the first and second antennas 211, 221, the signal processing device 120 therefore is able to determine the angular position of the target objects 3 along both the first direction 201 and the second direction 202.

With alternative embodiments of the individual radar devices 1 described herein, a first effective spacing between the first virtual antennas 601 may be different from a second effective spacing between the second virtual antennas 602. Additionally or alternatively, a distance between the individual first receive antennas 215 may be different from a distance between the individual second receive antennas 225 and/or, accordingly, a distance between the individual first transmit antennas 214 may be different from a distance between the individual second transmit antennas 224. Furthermore, the first transmit antennas 214 and/or the first receive antennas 215 may have an unequal spacing among each other. Likewise, the second transmit antennas 224 and/or the second receive antennas 225 may have an unequal spacing among each other. With all these embodiments, the signal processing device 120 may be configured to take these unequal spacings or distances into account when constructing the common virtual antenna array 650.

Figure 11:
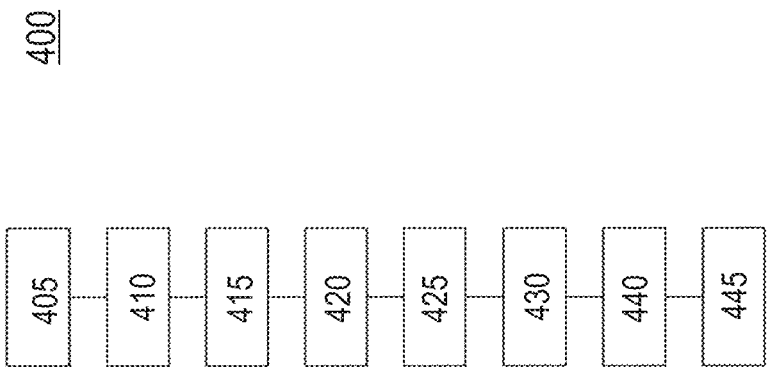
FIG. 11 a method for operating a radar device according to the present disclosure.

FIG. 11 depicts a method 400 for operating a radar device 1 according to the present disclosure. The method 400 comprises transceiving radar signals by generating 405 the first radar signals 11, 16 occupying the first frequency band 31 and the second radar signals 12, 17 occupying the second frequency band 31 with the transmit chains 125, 126 of the signal generator 105 of the radar circuit 100. The method then comprises routing 410 the radar signals 11, 12, 16, 17 via signal ports 130, 131, 133 to the antenna device 200. The method 400 further comprises transducing the first and second radar signals 11, 12, 16, 17 with the antenna device 200 by radiating 415 the first radar signals 11, 16 via the first transmit antennas 211 and the second radar signals 12, 17 via the second transmit antennas 221.

The method 400 then comprises transducing radar signals by capturing 420 the first radar signals 21, 26 via the first receive antennas 211 and the second radar signals 22, 27 via the second receive antennas 221 of the antenna device 200, respectively. The method further comprises routing 425 the radar signals 21, 22, 26, 27 from the antenna device 200 via the receive signal ports 135, 136, 137 to the radar circuit 100. The method 400 further comprises measuring the received radar signals 21, 22, 26, 27 by generating 430 the data signals 123, 124 representing the received radar signals 21, 22, 26, 27 with the receive chains 127, 128. The method 400 then comprises detecting 440, with the signal processing device 120, from the first radar signals 21, 26 target reflections via the first propagation channels 70, 72, 74, 76 and from the second radar signals 22, 27 target reflections via the second propagation channels 71, 73, 75, 77. Subsequently, the method 400 comprises jointly evaluating 445 the target reflections via the first and second propagation channels 70, 71, 72, 73, 74, 75, 76, 77 by forming a common virtual antenna array 650 and determining angular positions of the target objects 3 irradiated by the antenna device 200.

Figure 12:
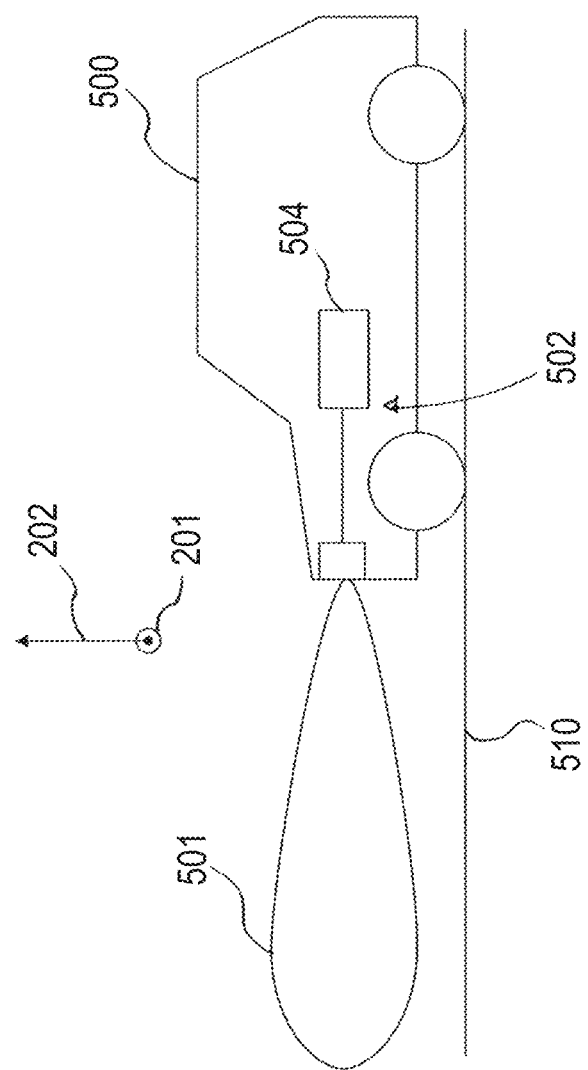
FIG. 12 a vehicle that is equipped with a radar device according to the present disclosure

FIG. 12 depicts a vehicle 500 that is equipped with a radar device 1 according to the present disclosure. In the embodiment shown in FIG. 12, the radar device 1 is configured as a front radar of the vehicle 1 and a radiation field 501 of an antenna device of the radar device 1 is directed in the forward direction of the vehicle 500. The radar device 1 is part of a vehicle control system 502 of the vehicle 500 and is connected to a control device 504 of the vehicle control system 502. The control device 504 is configured to perform advanced driver-assistance functions, such as adaptive cruise control, emergency brake assist, lane change assist or autonomous driving, based on data signals received from the radar device 1. These data signals represent the positions of target objects in front of the radar device 1 mounted to the vehicle 500. The control device 504 is configured to at least partially control the motion of the vehicle 500 based on the data signals received from the radar device 1. For controlling the motion of the vehicle, the control device 504 may be configured to brake and/or accelerate and/or steer the vehicle 500.

What is claimed is:

1. A radar device for automotive applications, the radar device comprising:
   a radar circuit configured to receive radar signals including first radar signals that occupy a first frequency band and second radar signals that occupy a separate second frequency band;
   an antenna device configured to selectively transduce the first radar signals via a first set of antennas and not via a second set of antennas, and selectively transduce the second radar signals via the second set of antennas and not via the first set of antennas; and
   a signal processing device configured to:
      detect, from the transduced first radar signals, first target reflections via first propagation channels;
      detect, from the transduced second radar signals, second target reflections via second propagation channels; and
      jointly evaluate the first and second target reflections via the first and second propagation channels to form a common virtual antenna array for determining an angular position of a target object irradiated by the antenna device.

2. The radar device according to claim 1, wherein:
   a phase center of a first reference transmit antenna from the first set of antennas coincides with a phase center of a second reference transmit antenna from the second set of antennas; and
   a phase center of a first reference receive antenna from the first set of antennas coincides with a phase center of a second reference receive antenna from the second set of antennas.

3. The radar device according to claim 2, wherein:
   the signal processing device is configured to measure a phase difference between a first reference signal propagating via a first reference propagation channel established between the first reference transmit and the first reference receive antenna, and a second reference signal propagating via a second reference propagation channel established between the second reference transmit antenna and the second reference receive antenna,
   the signal processing device is configured to compensate the measured phase difference when jointly evaluating the first and second target reflections via the first reference propagation channel and the second reference propagation channel.

4. The radar device according to claim 2, wherein the signal processing device is configured to compensate for at least one of:
   an angle-dependent phase shift ($\Delta\varphi\_AZ$, $\Delta\varphi\_EL$) caused by different radiation patterns of the first reference antennas within the first frequency band and the second reference antennas within second frequency band;
   a range-dependent phase shift ($\Delta\varphi\_RANGE$) caused by a change of a distance to the target object in between the first and second target reflections of the first reference signal and the first and second target reflections of the second reference signal; or
   a global phase offset ($\Delta\varphi\_GL$) of the first reference signal from the second reference signal upon generation of the first reference signal and the second reference signal.

5. The radar device according to claim 2, wherein the signal processing device is configured to compensate for:
   an angle-dependent phase shift ($\Delta\varphi\_AZ$, $\Delta\varphi\_EL$) caused by different radiation patterns of the first reference antennas within the first frequency band and the second reference antennas within second frequency band;

a range-dependent phase shift ($\Delta\varphi\_RANGE$) caused by a change of a distance to the target object in between the first and second target reflections of the first reference signal and the first and second target reflections of the second reference signal; and a global phase offset ($\Delta\varphi\_GL$) of the first reference signal from the second reference signal upon generation of the first reference signal and the second reference signal.

6. The radar device according to claim 1, wherein the signal processing device is configured to determine the angular position of the target object from relative phase shifts between all target reflections propagating via the first propagation channels and the second propagation channels.

7. The radar device according to claim 6, wherein the signal processing device is configured to jointly evaluate phase values derived from all the first propagation channels and the second propagation channels to determine the angular position of the target object.

8. The radar device according to claim 7, wherein the signal processing device is configured to jointly evaluate phase values derived from all the first propagation channels and the second propagation channels to determine the angular position of the target object by preforming a common Fourier transform on the phase values.

9. The radar device according to claim 1, wherein:

all individual transmit antennas of the first set of antennas and the second set of antennas are aligned with each other along a first direction; and all individual receive antennas of the first set of antennas and the second set of antennas are aligned with each other along the first direction.

10. The radar device according to claim 1, wherein:

a part of at least one of the first set of antennas or the second set of antennas is distributed along a first direction;

a further part of the at least one of the first set of antennas or the second set of antennas is distributed along a second direction; and the second direction is different from the first direction.

11. The radar device according to claim 10, wherein the second direction is orthogonal to the first direction.

12. The radar device according to claim 10, wherein:

the radar device is for enabling a vehicle to navigate based in part on the angular position of the target object;

the first direction is an azimuthal direction with respect to a ground surface navigated by the vehicle; and the second direction is an elevation direction with respect to the ground surface navigated by the vehicle.

13. The radar device of claim 1, wherein a particular antenna of the first set of antennas and a particular antenna of the second set of antennas are coupled to a common signal port of the radar circuit, the common signal port being configured to route both the first radar signal transduced via the particular antenna of the first set of antennas and the second radar signal transduced via the particular antenna of the second set of antennas.

14. The radar device of claim 13, wherein a phase center of the particular antenna of the first set of antennas coincides with a phase center of the particular antenna of the second set of antennas.

15. The radar device of claim 13, wherein a phase center of the particular antenna of the first set of antennas is shifted with respect to a phase center of the particular antenna of the second set of antennas.

16. The radar device of claim 1, wherein:

at least one of the first set of antennas is coupled to a first integrated circuit of the radar circuit for transceiving a respective part of the first radar signal; and at least one of the second set of antennas is coupled to a second integrated circuit of the radar circuit for transceiving a respective part of the second radar signal.

17. The radar device of claim 1, wherein the radar device is for enabling a vehicle to navigate based in part on the angular position of the target object.

18. A method, comprising:

transceiving, with a radar circuit of a radar device, first radar signals that occupy a first frequency band and second radar signals that occupy a second frequency band;

transducing the first radar signals via first antennas of an antenna device of the radar device and not via second antennas of the antenna device;

transducing the second radar signals via the second antennas of the antenna device and not via the first antennas of the antenna device;

detecting, with a signal processing device of the radar device and from the transduced first radar signals, first target reflections via first propagation channels;

detecting, with the signal processing device and from the transduced second radar signals, second target reflections via second propagation channels; and jointly evaluating, with the signal processing device, the first and second target reflections via the first propagation channels and the first and second target reflections via the second propagation channels to form a common virtual antenna array for determining an angular position of a target object irradiated by the antenna device.

19. The method of claim 18, further comprising:

using the angular position of the target object for automotive applications executed by a vehicle.

20. A system comprising:

a vehicle that navigates based in part on radar signals; and a radar device configured to process the radar signals for the vehicle to enable vehicle navigation, the radar device configured to process the radar signals by:

transceiving first radar signals that occupy a first frequency band and second radar signals that occupy a second frequency band;

transducing the first radar signals via first antennas of an antenna device and not via second antennas;

transducing the second radar signals via the second antennas of the antenna device and not via the first antennas;

detecting, from the transduced first radar signals, first target reflections via first propagation channels;

detecting, from the transduced second radar signals, second target reflections via second propagation channels; and jointly evaluating the first and second target reflections via the first propagation channels and the first and second target reflections via the second propagation channels to form a common virtual antenna array for determining an angular position of a target object irradiated by the antenna device, thereby enabling navigation based in part on the radar signals by the vehicle.

* * * * *